United States Patent
Xu et al.

(10) Patent No.: US 12,082,185 B2
(45) Date of Patent: Sep. 3, 2024

(54) PENDING SR CANCELLATION METHOD AND APPARATUS

(71) Applicant: HUAWEI TECHNOLOGIES CO., LTD., Guangdong (CN)

(72) Inventors: Haibo Xu, Beijing (CN); Xiao Xiao, Beijing (CN); Chuting Yao, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 17/603,333

(22) PCT Filed: Apr. 28, 2020

(86) PCT No.: PCT/CN2020/087482
§ 371 (c)(1),
(2) Date: Oct. 12, 2021

(87) PCT Pub. No.: WO2020/221246
PCT Pub. Date: Nov. 5, 2020

(65) Prior Publication Data
US 2022/0210801 A1 Jun. 30, 2022

(30) Foreign Application Priority Data

Apr. 30, 2019 (CN) .......................... 201910364599.X

(51) Int. Cl.
*H04W 72/1263* (2023.01)
*H04W 72/21* (2023.01)
(Continued)

(52) U.S. Cl.
CPC ....... *H04W 72/1263* (2013.01); *H04W 72/21* (2023.01); *H04W 72/23* (2023.01);
(Continued)

(58) Field of Classification Search
CPC . H04W 72/1263; H04W 72/21; H04W 72/23; H04W 72/542; H04W 80/02; H04W 92/18
See application file for complete search history.

(56) References Cited

U.S. PATENT DOCUMENTS

2011/0059745 A1* 3/2011 Yi .......................... H04W 24/08
455/452.2
2011/0176513 A1* 7/2011 Yi .......................... H04W 24/08
370/328
(Continued)

FOREIGN PATENT DOCUMENTS

CN 101771521 A 7/2010
CN 106031224 A 10/2016
(Continued)

OTHER PUBLICATIONS

R2-163811, Huawei et al., Support of QoS for PC5-based V2V transport, 3GPP TSG-RAN WG2 Meeting #94, Nanjing, China, May 23-27, 2016, total 6 pages.
(Continued)

*Primary Examiner* — Christine Ng
(74) *Attorney, Agent, or Firm* — HUAWEI TECHNOLOGIES CO., LTD.

(57) ABSTRACT

This application provides a pending SR cancellation method and an apparatus. In the method, when a specific condition is met, a terminal cancels a pending SR triggered by an uplink BSR, and when some other conditions are met, the terminal cancels a pending SR triggered by a sidelink BSR. In other words, the terminal may independently cancel the SR triggered by the uplink BSR and the SR triggered by the sidelink BSR. When canceling the SR triggered by the uplink BSR, the terminal may not cancel the SR triggered by the sidelink BSR, so that when sidelink data has a relatively high latency requirement.

17 Claims, 7 Drawing Sheets

(51) Int. Cl.
*H04W 72/23* (2023.01)
*H04W 72/542* (2023.01)
*H04W 80/02* (2009.01)
*H04W 92/18* (2009.01)

(52) U.S. Cl.
CPC .......... *H04W 72/542* (2023.01); *H04W 80/02* (2013.01); *H04W 92/18* (2013.01)

(56) References Cited

U.S. PATENT DOCUMENTS

| | | | | |
|---|---|---|---|---|
| 2012/0307767 | A1* | 12/2012 | Yamada | H04W 74/02 |
| | | | | 370/329 |
| 2015/0092542 | A1* | 4/2015 | Yang | H04W 28/0268 |
| | | | | 370/311 |
| 2016/0044701 | A1* | 2/2016 | Zhang | H04W 72/21 |
| | | | | 370/329 |
| 2016/0044707 | A1* | 2/2016 | Folke | H04W 72/1268 |
| | | | | 370/329 |
| 2016/0128094 | A1 | 5/2016 | Lee et al. | |
| 2017/0238337 | A1 | 8/2017 | Lee et al. | |
| 2017/0289908 | A1* | 10/2017 | Lee | H04W 52/0216 |
| 2017/0310433 | A1 | 10/2017 | Dinan et al. | |
| 2018/0324872 | A1 | 11/2018 | Babaei et al. | |

FOREIGN PATENT DOCUMENTS

| | | |
|---|---|---|
| CN | 107079327 A | 8/2017 |
| CN | 107347215 A | 11/2017 |
| JP | 2017538374 A | 12/2017 |

OTHER PUBLICATIONS

3GPP TS 38.321 V15.5.0 (Mar. 2019), 3rd Generation Partnership Project; Technical Specification Group Radio Access Network; NR; Medium Access Control (MAC) protocol specification (Release 15), total 78 pages.
R2-145066, ASUSTeK, Discussion on ProSe BSR and SR cancellation, 3GPP TSG-RAN2 Meeting #88, San Francisco, US, Nov. 17-21, 2014, total 3 pages.
R2-145038, LG Electronics Inc., SR cancellation for Prose communication, 3GPP TSG-RAN WG2 Meeting #88, San Francisco, USA, Nov. 17-Nov. 21, 2014, total 5 pages.
TDoc R2-1904702, Ericsson, gNB-Scheduled Resource Allocation for Sidelink, 3GPP TSG-RAN WG2 #105bis, Xi''an, China, Apr. 8-12, 2019, total 4 pages.
R2-1901025, ASUSTeK, Discussion on Sidelink BSR cancellation condition, 3GPP TSG-RAN WG2 Meeting #105, Athen, Greece, Feb. 25-Mar. 1, 2019, 6 pages.
R2-1907450, Huawei et al., Further discussion on SR configuration and procedure for NR SL Mode-1, 3GPP TSG-RAN WG2 # 106, Reno, USA, May 13-17, 2019, 11 pages.

* cited by examiner

PENDING SR CANCELLATION METHOD AND APPARATUS

CROSS-REFERENCE TO RELATED APPLICATIONS

This application is a national stage of International Application No. PCT/CN2020/087482, filed on Apr. 28, 2020, which claims priority to Chinese Patent Application No. 201910364599.X, filed on Apr. 30, 2019. Both of the aforementioned applications are hereby incorporated by reference in their entireties.

TECHNICAL FIELD

This application relates to the field of communications technologies, and in particular, to a pending scheduling request (scheduling request, SR) cancellation method and an apparatus.

BACKGROUND

In a long term evolution (long term evolution, LTE) system or a new radio (new radio, NR) system, a terminal and a network device may communicate with each other, and terminals may also communicate with each other. A link over which the terminal sends data to the network device is referred to as an uplink (uplink, UL), and a link over which the terminal receives data from the network device is referred to as a downlink (downlink, DL). A link for transmitting data between the terminals is referred to as a sidelink (sidelink, SL).

For communication between the terminal and the network device, when the terminal has uplink data (UL data) that needs to be sent but does not have an available uplink grant (UL grant) (which may also be referred to as an uplink resource (UL Resource)), the terminal needs to trigger an SR, and requests a UL grant from the network device by sending the SR. After receiving the UL grant, the terminal may send an uplink buffer status report (buffer status report, BSR) to the network device by using the UL grant, so that the network device schedules an uplink resource.

For communication between the terminals, if a resource used by the terminal is scheduled by the network device, when the terminal has sidelink data (SL data) that needs to be sent but does not have an available sidelink grant (SL grant), the terminal also needs to trigger an SR, and requests a UL grant from the network device by sending the SR. After receiving the UL grant, the terminal may send a sidelink BSR to the network device by using the UL grant, so that the network device schedules a sidelink resource.

After an SR is triggered, the SR is considered as a pending (pending) SR until the SR is canceled. The terminal may cancel the pending SR when a specific condition is met. Currently, in an NR system, for an SR triggered by an uplink BSR, when a medium access control (medium access control, MAC) protocol data unit (protocol data unit, PDU) is transmitted, if the MAC PDU includes a long (Long) BSR MAC CE (where MAC CE is short for a MAC control element (MAC control element)) or a short (short) BSR MAC CE, and the long BSR MAC CE or the short BSR MAC CE includes a buffer status of the terminal up to a last event that triggers the uplink BSR, the terminal cancels all pending SRs that are triggered before the MAC PDU is assembled. Alternatively, when a UL grant can accommodate all available pending data, the terminal cancels all pending SRs. When the cancellation mechanism is used for an SR triggered by a sidelink BSR, a transmission latency of sidelink data may increase.

SUMMARY

Embodiments of this application provide a pending SR cancellation method and an apparatus, to avoid increasing a transmission latency of sidelink data.

To achieve the foregoing objective, the embodiments of this application provide the following technical solutions:

According to a first aspect, a pending SR cancellation method is provided, and includes: A communications apparatus triggers SRs. When a UL grant meets a first condition or an uplink MAC PDU meets a second condition, the communications apparatus cancels all pending SRs (denoted as first-type SRs) that are in the SRs and that are triggered by uplink BSRs; and/or when an SL grant meets a third condition, an uplink MAC PDU meets a fourth condition, a first sidelink logical channel meets a fifth condition, or the communications apparatus meets a sixth condition, the communications apparatus cancels all pending SRs (denoted as second-type SRs) that are in the SRs and that are triggered by first sidelink BSRs, where when the first sidelink logical channel meets the fifth condition, the first sidelink logical channel is a logical channel that triggers the first sidelink BSR.

According to the method provided in the first aspect, the communications apparatus may independently cancel the first-type SR and the second-type SR. In this case, when canceling the first-type SR, the communications apparatus may not cancel the second-type SR, so that when sidelink data has a relatively high latency requirement, the communications apparatus sends an SL RS to a network device by using an SR resource dedicated to sending an SL SR (a logical channel associated with the SR resource has a relatively high latency requirement), to request the network device to immediately allocate a transmission resource to the sidelink data, so as to ensure that a low-latency transmission requirement of the sidelink data is met.

With reference to the first aspect, in a first possible implementation, the communications apparatus is a terminal.

With reference to the first aspect or the first possible implementation of the first aspect, in a second possible implementation, in a possible implementation, that the UL grant meets the first condition includes: The UL grant is sufficient to accommodate all available pending uplink data. It may be understood that when the UL grant meets the first condition, the communications apparatus only needs to send all the available pending uplink data by using the UL grant, and does not need to send the first-type SR to the network device to request an uplink transmission resource. Therefore, the communications apparatus can cancel the pending first-type SR, to avoid a resource waste caused by sending of the first-type SR.

With reference to the second possible implementation of the first aspect, in a third possible implementation, the second-type SR includes a first sub-type SR of a second type, the first sub-type SR of the second type is an SR triggered by a second sidelink BSR, a second sidelink logical channel that triggers the second sidelink BSR meets a seventh condition, the second sidelink BSR belongs to the first sidelink BSR, and the seventh condition is: at least one of an SR configuration to which the second sidelink logical channel is mapped and an SR resource to which the second sidelink logical channel is mapped is also mapped to at least one uplink logical channel; or a configuration corresponding to the second sidelink logical channel or an SR configuration to which the second sidelink logical channel is mapped includes first indication information, where the first indication information indicates to cancel, when the UL grant meets the first condition, the SR triggered by the second sidelink BSR. The method further includes: The communications apparatus cancels all pending first sub-type SRs of the second type in the SRs.

With reference to the first aspect or the first possible implementation of the first aspect, in a fourth possible implementation, that the uplink MAC PDU meets the second condition includes: The uplink MAC PDU includes a non-truncated uplink BSR MAC CE, where the non-truncated uplink BSR MAC CE includes a buffer status of the communications apparatus up to (and including) a last event that triggers the uplink BSR before the uplink MAC PDU is assembled. That the communications apparatus cancels all pending first-type SRs includes: When the uplink MAC PDU is transmitted, the communications apparatus cancels all pending first-type SRs that are triggered before the uplink MAC PDU is assembled. In this possible implementation, when the uplink MAC PDU meets the second condition, the communications apparatus may cancel only the first-type SR, and the terminal does not cancel a pending second-type SR even if there is the pending second-type SR. If sidelink data having a relatively high latency requirement needs to be transmitted, the terminal may request, by using an SR resource dedicated to transmitting an SL SR, the network device to immediately allocate an SL grant, to meet a transmission latency requirement of the sidelink data.

With reference to the fourth possible implementation of the first aspect, in a fifth possible implementation, the second-type SR includes a second sub-type SR of a second type, the second sub-type SR of the second type is an SR triggered by a third sidelink BSR, a third sidelink logical channel that triggers the third sidelink BSR meets an eighth condition, the third sidelink BSR belongs to the first sidelink BSR, and the eighth condition is: at least one of an SR configuration to which the third sidelink logical channel is mapped and an SR resource to which the third sidelink logical channel is mapped is also mapped to at least one uplink logical channel; or a configuration corresponding to the third sidelink logical channel or an SR configuration to which the third sidelink logical channel is mapped includes second indication information, where the second indication information indicates to cancel, when the uplink MAC PDU meets the second condition, the SR triggered by the third sidelink BSR. The method further includes: When the uplink MAC PDU is transmitted, the communications apparatus cancels all pending second sub-type SRs of the second type that are triggered before the uplink MAC PDU is assembled.

With reference to the first aspect or the first possible implementation of the first aspect, in a sixth possible implementation, that the SL grant meets the third condition includes: The SL grant is sufficient to accommodate all available pending sidelink data. In this possible implementation, when the SL grant is sufficient to accommodate all the available pending sidelink data, the communications apparatus cancels the second-type SR. This avoids problems that an SL SR is sent for a plurality of times and the network device repeatedly allocates the SL grant to the communications apparatus, and avoids a resource waste.

With reference to the sixth possible implementation of the first aspect, in a seventh possible implementation, the second-type SR includes a third sub-type SR of a second type, the second-type SR is the third sub-type SR of the second type, the third sub-type SR of the second type is an SR triggered by a fourth sidelink BSR, a fourth sidelink logical channel that triggers the fourth sidelink BSR meets a ninth condition, the fourth sidelink BSR belongs to the first sidelink BSR, and the ninth condition is: the fourth sidelink logical channel and any uplink logical channel are mapped to different SR configurations and/or different SR resources; or a configuration corresponding to the fourth sidelink logical channel or an SR configuration to which the fourth sidelink logical channel is mapped includes third indication information, where the third indication information indicates to cancel, when the SL grant meets the third condition, the SR triggered by the fourth sidelink BSR.

With reference to the first aspect or the first possible implementation of the first aspect, in an eighth possible implementation, that the uplink MAC PDU meets the fourth condition includes: The uplink MAC PDU includes a non-truncated sidelink BSR MAC CE, where the non-truncated sidelink BSR MAC CE includes a buffer status of the communications apparatus up to (and including) a last event that triggers a sidelink BSR before the uplink MAC PDU is assembled. That the communications apparatus cancels all pending second-type SRs includes: When the uplink MAC PDU is transmitted, the communications apparatus cancels all pending second-type SRs that are triggered before the uplink MAC PDU is assembled. It may be understood that if the uplink MAC PDU includes the non-truncated sidelink BSR MAC CE, it indicates that the uplink MAC PDU includes buffer statuses of all sidelink logical channel groups, and the included buffer statuses are latest buffer statuses. In this case, the network device only needs to allocate an SL grant to the communications apparatus by using the sidelink BSR MAC CE in the uplink MAC PDU, and the communications apparatus does not need to send an SR to request a resource for transmitting the sidelink BSR. Therefore, the communications apparatus may cancel the pending second-type SR, to avoid a resource waste caused by sending of the second-type SR.

With reference to the eighth possible implementation of the first aspect, in a ninth possible implementation, the second-type SR includes a fourth sub-type SR of a second type, the second-type SR is the fourth sub-type SR of the second type, the fourth sub-type SR of the second type is an SR triggered by a fifth sidelink BSR, a fifth sidelink logical channel that triggers the fifth sidelink BSR meets a tenth condition, the fifth sidelink BSR belongs to the first sidelink BSR, and the tenth condition is: the fifth sidelink logical channel and any uplink logical channel are mapped to different SR configurations and/or different SR resources; or a configuration corresponding to the fifth sidelink logical channel or an SR configuration to which the fifth sidelink logical channel is mapped includes fourth indication information, where the fourth indication information indicates to cancel, when the uplink MAC PDU meets the fourth condition, the SR triggered by the fifth sidelink BSR.

With reference to the first aspect or the first possible implementation of the first aspect, in a tenth possible implementation, that the first sidelink logical channel meets the fifth condition includes: An autonomous resource selection manner is configured for use on the first sidelink logical channel. In this possible implementation, when the autonomous resource selection manner is configured for use on the first sidelink logical channel, the communications apparatus does not need to request a transmission resource corresponding to the first sidelink logical channel from the network device. Therefore, the communications apparatus may cancel the second-type SR, to avoid unnecessary transmission of the second-type SR and save transmission resources.

With reference to the first aspect or the first possible implementation of the first aspect, in an eleventh possible implementation, that the communications apparatus meets the sixth condition includes: The communications apparatus is configured to use an autonomous resource selection manner. In this possible implementation, when the communications apparatus is configured to use the autonomous resource selection manner, the communications apparatus does not need to request a sidelink transmission resource from the network device. Therefore, the communications apparatus may cancel the second-type SR, to avoid unnecessary transmission of the second-type SR and save transmission resources.

According to a second aspect, a pending SR cancellation method is provided, and includes: A communications apparatus triggers SRs. When an uplink MAC PDU meets a preset condition, and the uplink MAC PDU is transmitted, the communications apparatus cancels all pending SRs that are triggered before the uplink MAC PDU is assembled.

According to the method provided in the second aspect, the communications apparatus may uniformly cancel the pending SRs. Compared with Embodiment 1, this method can reduce implementation complexity of the communications apparatus.

With reference to the second aspect, in a first possible implementation, that the uplink MAC PDU meets the preset condition includes: The uplink MAC PDU includes a non-truncated sidelink BSR MAC CE, where the non-truncated sidelink BSR MAC CE includes a buffer status of the communications apparatus up to (and including) a last event that triggers a sidelink BSR before the uplink MAC PDU is assembled.

With reference to the first possible implementation of the second aspect, in a second possible implementation, during logical channel priority processing, a priority of an uplink BSR MAC CE is higher than a priority of a sidelink BSR MAC CE.

With reference to the second aspect, in a third possible implementation, that the uplink MAC PDU meets the preset condition includes: During logical channel priority processing, a priority of a sidelink BSR MAC CE is higher than a priority of an uplink BSR MAC CE, and the uplink MAC PDU includes a non-truncated uplink BSR MAC CE, where the non-truncated uplink BSR MAC CE includes a buffer status of the communications apparatus up to (and including) a last event that triggers an uplink BSR before the uplink MAC PDU is assembled.

With reference to the second aspect, in a fourth possible implementation, that the uplink MAC PDU meets the preset condition includes: The uplink MAC PDU includes a non-truncated uplink BSR MAC CE and a non-truncated sidelink BSR MAC CE, where the non-truncated uplink BSR MAC CE includes a buffer status of the communications apparatus up to (and including) a last event that triggers an uplink BSR before the uplink MAC PDU is assembled, and the non-truncated sidelink BSR MAC CE includes a buffer status of the communications apparatus up to (and including) a last event that triggers a sidelink BSR before the uplink MAC PDU is assembled.

With reference to the second aspect, in a fifth possible implementation, that the uplink MAC PDU meets the preset condition includes: The uplink MAC PDU includes all available pending uplink data.

According to a third aspect, a pending SR cancellation method is provided, and includes: A communications apparatus triggers SRs. When a UL grant is sufficient to accommodate all available pending uplink data, the communications apparatus cancels all pending first-type SRs in the SRs, where the first-type SR is an SR triggered by an uplink BSR; and/or when an uplink MAC PDU is transmitted, the communications apparatus cancels all pending first-type SRs that are in the SRs and that are triggered before the uplink MAC PDU is assembled, where the first-type SR is an SR triggered by an uplink BSR, the uplink MAC PDU includes a non-truncated uplink BSR MAC CE, and the non-truncated uplink BSR MAC CE includes a buffer status of the communications apparatus up to (and including) a last event that triggers the uplink BSR before the uplink MAC PDU is assembled.

According to a fourth aspect, a pending SR cancellation is provided, and includes any one or more of the following methods:

Method (1): A communications apparatus triggers SRs; and when an SL grant is sufficient to accommodate all available pending sidelink data, the communications apparatus cancels all pending second-type SRs in the SRs, where the second-type SR is an SR triggered by a sidelink BSR.

Method (2): A communications apparatus triggers SRs; and when an uplink MAC PDU is transmitted, the communications apparatus cancels all pending second-type SRs that are in the SRs and that are triggered before the uplink MAC PDU is assembled, where the second-type SR is an SR triggered by a sidelink BSR, the uplink MAC PDU includes a non-truncated sidelink BSR MAC CE, and the non-truncated sidelink BSR MAC CE includes a buffer status of the communications apparatus up to (and including) a last event that triggers the sidelink BSR before the uplink MAC PDU is assembled.

Method (3): A communications apparatus triggers SRs; and when an autonomous resource selection manner is configured for use on a first sidelink logical channel, the communications apparatus cancels all pending second-type SRs in the SRs, where the second-type SR is an SR triggered by a sidelink BSR, and the sidelink BSR is triggered by the first sidelink logical channel.

Method (4): A communications apparatus triggers SRs; and when the communications apparatus is configured to use an autonomous resource selection manner, the communications apparatus cancels all pending second-type SRs in the SRs, where the second-type SR is an SR triggered by a sidelink BSR.

According to a fifth aspect, a pending SR cancellation method is provided, and includes: A communications apparatus triggers SRs. When a UL grant meets a first condition, the communications apparatus cancels all pending type-1 SRs and all pending type-2 SRs in the SRs, where the type-1 SR is an SR triggered by an uplink BSR, the type-2 SR is an SR triggered by a sidelink BSR, and a sidelink logical channel that triggers the sidelink BSR meets the following condition: at least one of an SR configuration to which the sidelink logical channel is mapped and an SR resource to which the sidelink logical channel is mapped is also mapped to at least one uplink logical channel; or a configuration corresponding to the sidelink logical channel or an SR configuration to which the sidelink logical channel is mapped includes first indication information, where the first indication information indicates to cancel, when the UL grant meets the first condition, the SR triggered by the sidelink BSR; and that the UL grant meets the first condition includes: The UL grant is sufficient to accommodate all available pending uplink data.

According to a sixth aspect, a pending SR cancellation method is provided, and includes: A communications apparatus triggers SRs. When an uplink MAC PDU meets a second condition, and the uplink MAC PDU is transmitted, the communications apparatus cancels all pending type-1 SRs and all pending type-3 SRs that are in the SRs and that are triggered before the uplink MAC PDU is assembled, where the type-1 SR is an SR triggered by an uplink BSR, the type-3 SR is an SR triggered by a sidelink BSR, and a sidelink logical channel that triggers the sidelink BSR meets the following condition: at least one of an SR configuration to which the sidelink logical channel is mapped and an SR resource to which the sidelink logical channel is mapped is also mapped to at least one uplink logical channel; or a configuration corresponding to the sidelink logical channel or an SR configuration to which the sidelink logical channel is mapped includes second indication information, where the second indication information indicates to cancel, when the uplink MAC PDU meets the second condition, the SR triggered by the sidelink BSR; and that the uplink MAC PDU meets the second condition includes: The uplink MAC PDU includes a non-truncated uplink BSR MAC CE, where the non-truncated uplink BSR MAC CE includes a buffer status of the communications apparatus up to (and including) a last event that triggers the uplink BSR before the uplink MAC PDU is assembled.

According to a seventh aspect, a pending SR cancellation method is provided, and includes: A communications apparatus triggers SRs. When an SL grant meets a third condition, the communications apparatus cancels all pending type-4 SRs in the SRs, where the type-4 SR is an SR triggered by a sidelink BSR, and a sidelink logical channel that triggers the sidelink BSR meets the following condition: the sidelink logical channel and any uplink logical channel are mapped to different SR configurations and/or different SR resources; or a configuration corresponding to the sidelink logical channel or an SR configuration to which the sidelink logical channel is mapped includes third indication information, where the third indication information indicates to cancel, when the SL grant meets the third condition, the SR triggered by the sidelink BSR; and that the SL grant meets the third condition includes: The SL grant is sufficient to accommodate all available pending sidelink data.

According to an eighth aspect, a pending SR cancellation method is provided, and includes: A communications apparatus triggers SRs. When an uplink MAC PDU meets a fourth condition, and the uplink MAC PDU is transmitted, the communications apparatus cancels all pending type-5 SRs that are in the SRs and that are triggered before the uplink MAC PDU is assembled, where the type-5 SR is an SR triggered by a sidelink BSR, and a sidelink logical channel that triggers the sidelink BSR meets the following condition: the sidelink logical channel and any uplink logical channel are mapped to different SR configurations and/or different SR resources; or a configuration corresponding to the sidelink logical channel or an SR configuration to which the sidelink logical channel is mapped includes fourth indication information, where the fourth indication information indicates to cancel, when the uplink MAC PDU meets the fourth condition, the SR triggered by the sidelink BSR; and that the uplink MAC PDU meets the fourth condition includes: The uplink MAC PDU includes a non-truncated sidelink BSR MAC CE, where the non-truncated sidelink BSR MAC CE includes a buffer status of the communications apparatus up to (and including) a last event that triggers the sidelink BSR before the uplink MAC PDU is assembled.

For beneficial effects of the third aspect to the eighth aspect, refer to beneficial effects of corresponding implementations of the first aspect. Details are not described herein again.

According to a ninth aspect, a communication method is provided, and includes: A first communications apparatus sends an identifier of a first QoS flow and a QoS parameter corresponding to the first QoS flow to a second communications apparatus, where data carried in the first QoS flow is sidelink data. The first communications apparatus receives a mapping relationship between the identifier of the first QoS flow and an identifier of a target sidelink radio bearer, an identifier of a target sidelink logical channel, or an identifier of a target sidelink logical channel group from the second communications apparatus, where the target sidelink logical channel is used to transmit the data carried in the first QoS flow, the target sidelink radio bearer is a sidelink radio bearer to which the target sidelink logical channel belongs, and the target sidelink logical channel group is a sidelink logical channel group to which the target sidelink logical channel belongs.

In the prior art, when requesting a sidelink logical channel from the second communications apparatus for a QoS flow for carrying sidelink data, the first communications apparatus needs to send a QoS parameter corresponding to the QoS flow to the second communications apparatus. To enable the first communications apparatus to determine a specific QoS flow to which an allocated sidelink logical channel corresponds, the second communications apparatus notifies the first communications apparatus of a correspondence between an identifier of the sidelink logical channel and the QoS parameter. Because the QoS parameter includes a relatively large amount of information, a large quantity of transmission resources need to be consumed. According to the method provided in the ninth aspect, the first communications apparatus may allocate an identifier corresponding to the QoS flow. When requesting the sidelink logical channel from the second communications apparatus for the QoS flow for carrying the sidelink data, the first communications apparatus may send the identifier of the QoS flow and the QoS parameter corresponding to the QoS flow to the second communications apparatus, and the second communications apparatus may send a correspondence between the identifier of the allocated sidelink logical channel and the identifier of the QoS flow to the first communications apparatus. Then, the first communications apparatus may determine, based on the correspondence, the sidelink logical channel for transmitting the data carried in the QoS flow, and the second communications apparatus does not need to send the correspondence between the identifier of the sidelink logical channel and the QoS parameter to the first communications apparatus. Therefore, transmission resources can be saved.

With reference to the ninth aspect, in a first possible implementation, the method further includes: The first communications apparatus receives, from the second communications apparatus, a configuration corresponding to the target sidelink logical channel or an SR configuration to which the target sidelink logical channel is mapped, where the configuration corresponding to the target sidelink logical channel or the SR configuration to which the target sidelink logical channel is mapped includes one or more of first indication information, second indication information, third indication information, and fourth indication information.

For related descriptions of the first indication information, the second indication information, the third indication information, and the fourth indication information, refer to the foregoing descriptions. Details are not described herein again.

According to a tenth aspect, a communication method is provided, and includes: A second communications apparatus receives an identifier of a first QoS flow and a QoS parameter corresponding to the first QoS flow from a first communications apparatus, where data carried in the first QoS flow is sidelink data. The second communications apparatus sends a mapping relationship between the identifier of the first QoS flow and an identifier of a target sidelink radio bearer, an identifier of a target sidelink logical channel, or an identifier of a target sidelink logical channel group to the first communications apparatus based on the QoS parameter, where the target sidelink logical channel is used to transmit the data carried in the first QoS flow, the target sidelink radio bearer is a sidelink radio bearer to which the target sidelink logical channel belongs, and the target sidelink logical channel group is a sidelink logical channel group to which the target sidelink logical channel belongs.

In the prior art, when requesting a sidelink logical channel from the second communications apparatus for a QoS flow for carrying sidelink data, the first communications apparatus needs to send a QoS parameter corresponding to the QoS flow to the second communications apparatus. To enable the first communications apparatus to determine a specific QoS flow to which an allocated sidelink logical channel corresponds, the second communications apparatus notifies the first communications apparatus of a correspondence between an identifier of the sidelink logical channel and the QoS parameter. Because the QoS parameter includes a relatively large amount of information, a large quantity of transmission resources need to be consumed. According to the method provided in the tenth aspect, the first communications apparatus may allocate an identifier corresponding to the QoS flow. When requesting the sidelink logical channel from the second communications apparatus for the QoS flow for carrying the sidelink data, the first communications apparatus may send the identifier of the QoS flow and the QoS parameter corresponding to the QoS flow to the second communications apparatus, and the second communications apparatus may send a correspondence between the identifier of the allocated sidelink logical channel and the identifier of the QoS flow to the first communications apparatus. Then, the first communications apparatus may determine, based on the correspondence, the sidelink logical channel for transmitting the data carried in the QoS flow, and the second communications apparatus does not need to send the correspondence between the identifier of the sidelink logical channel and the QoS parameter to the first communications apparatus. Therefore, transmission resources can be saved.

With reference to the tenth aspect, in a first possible implementation, the method further includes: The second communications apparatus sends, to the first communications apparatus, a configuration corresponding to the target sidelink logical channel or an SR configuration to which the target sidelink logical channel is mapped, where the configuration corresponding to the target sidelink logical channel or the SR configuration to which the target sidelink logical channel is mapped includes one or more of first indication information, second indication information, third indication information, and fourth indication information.

For related descriptions of the first indication information, the second indication information, the third indication information, and the fourth indication information, refer to the foregoing descriptions. Details are not described herein again.

According to an eleventh aspect, a communications apparatus is provided. The apparatus has a function of implementing any method according to any one of the first aspect to the tenth aspect. The function may be implemented by hardware, or may be implemented by hardware executing corresponding software. The hardware or the software includes one or more units, modules, or circuits corresponding to the foregoing function. The apparatus may exist in a product form of a chip, or may include a plurality of apparatuses.

According to a twelfth aspect, a communications apparatus is provided. The communications apparatus includes a memory and a processor. Optionally, the communications apparatus further includes at least one communications interface and a communications bus. The memory is configured to store computer execution instructions. The processor, the memory, and the at least one communications interface are connected through the communications bus. The processor executes the computer execution instructions stored in the memory, so that the communications apparatus implements any method according to any one of the first aspect to the tenth aspect. The apparatus may exist in a product form of a chip.

According to a thirteenth aspect, a computer readable storage medium is provided, and includes instructions. When the instructions are run on a computer, the computer is enabled to perform any method according to any one of the first aspect to the tenth aspect.

According to a fourteenth aspect, a computer program product including instructions is provided. When the computer program product runs on a computer, the computer is enabled to perform any method according to any one of the first aspect to the tenth aspect.

According to a fourteenth aspect, a communications system is provided. The communications system may include the communications apparatus according to any one of the first aspect to the tenth aspect, or the implementations of the first aspect to the tenth aspect.

For technical effects brought in any design of the eleventh aspect to the fifteenth aspect, refer to technical effects brought in a corresponding design of the first aspect to the tenth aspect. Details are not described herein again.

It should be noted that various possible implementations of any one of the foregoing aspects may be combined provided that the solutions are not contradictory.

DESCRIPTION OF EMBODIMENTS

In the descriptions of this application, unless otherwise specified, "/" means "or". For example, A/B may represent A or B. The term "and/or" in this specification describes only an association relationship for describing associated objects and represents that three relationships may exist. For example, A and/or B may represent the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

The technical solutions provided in the embodiments of this application may be applied to various communications systems. For example, the communications systems include but are not limited to an LTE system, a 5th generation (5th-generation, 5G) system, an NR system, and a future evolved system, or a plurality of converged communications systems. The 5G system may be a non-standalone (non-standalone, NSA) 5G system or a standalone (standalone, SA) 5G system.

Figure 1:
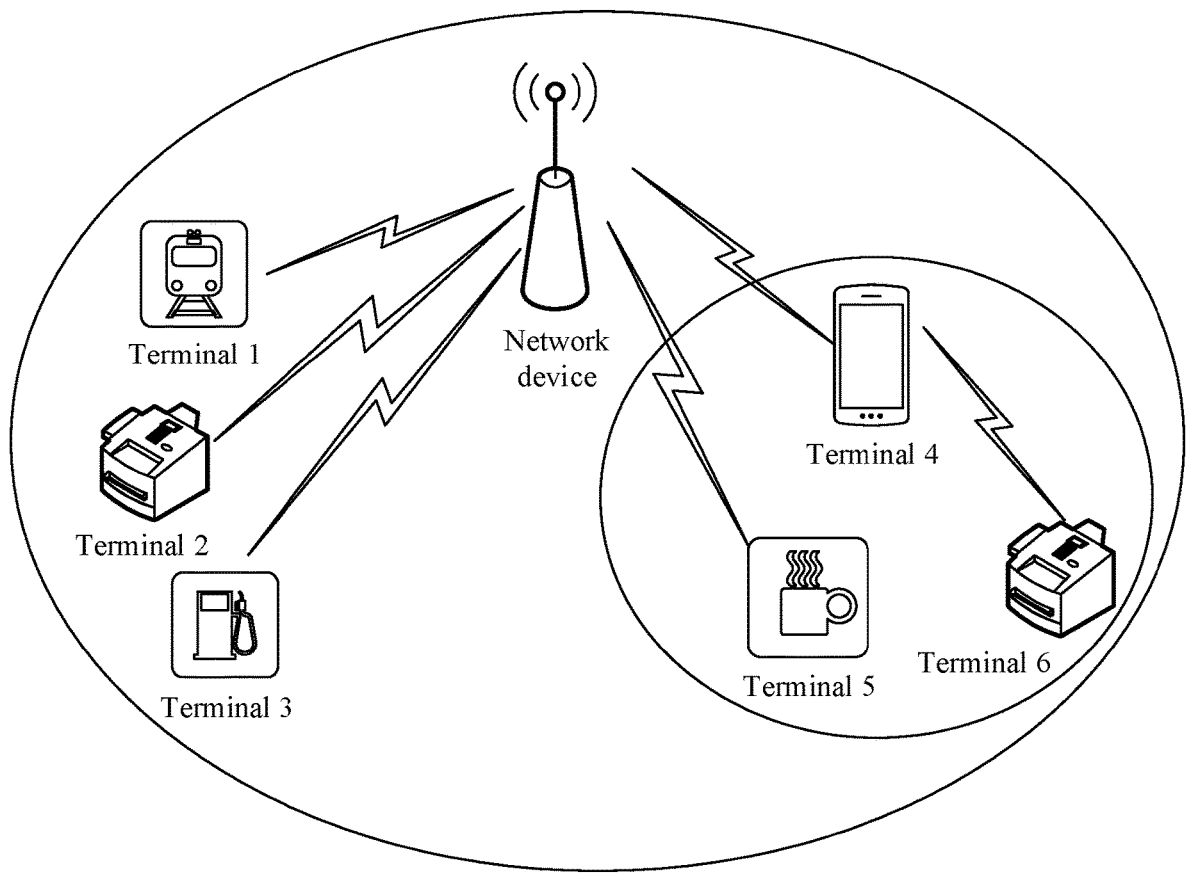
FIG. 1 is a schematic composition diagram of a network architecture according to an embodiment of this application.

FIG. 1 is a schematic diagram of a communications system to which this application is applicable. The communications system may include at least one network device (FIG. 1 shows only one network device) and at least one terminal (FIG. 1 shows six terminals: a terminal 1 to a terminal 6). One or more of the terminal 1 to the terminal 6 may communicate with the network device, to transmit one or more of data and signaling, for example, transmit an SR or a MAC PDU in the embodiments of this application. A communications interface between the terminal and the network device is referred to as a Uu interface. A link on which the terminal sends data to the network device is referred to as an uplink, and a link on which the terminal receives data from the network device is referred to as a downlink.

In addition, the terminal 4 to the terminal 6 in FIG. 1 may also form another communications system applicable to this application. In this case, both a sending entity and a receiving entity are the terminals. For example, the terminal 4 to the terminal 6 may form a vehicle-to-everything system. In this case, the terminal 4 may send data or signaling to the terminal 5, and the terminal 5 receives the data or the signaling sent by the terminal 4. A communications interface between the terminals is referred to as a PC5 interface. The PC5 interface is usually used in a scenario in which direct communication, such as device-to-device (device-to-device, D2D) communication or vehicle-to-everything (vehicle to everything, V2X) communication (special D2D communication), can be performed between devices. A link for transmitting data between the terminals is referred to as a sidelink.

The network device is an entity that is on a network side and that is configured to send a signal, or receive a signal, or send a signal and receive a signal. The network device may be an apparatus that is deployed in a radio access network (radio access network, RAN) and that provides a wireless communication function for the terminal. The network device may include base stations in various forms, for example, a macro base station, a micro base station (also referred to as a small cell), a relay station, and an access point (access point, AP), or may include control nodes in various forms, for example, a network controller. The control node may be connected to a plurality of base stations, and configure resources for a plurality of terminals in coverage of the plurality of base stations. In systems using different radio access technologies, names of devices having base station functions may be different. For example, a base station in an LTE system may be referred to as an evolved NodeB (evolved NodeB, eNB, or eNodeB), and a base station in a 5G system or an NR system may be referred to as a next generation NodeB (next generation node base station, gNB). A specific name of the base station is not limited in this application. Alternatively, the network device may be a radio controller in a cloud radio access network (cloud radio access network, CRAN) scenario, a network device in a future evolved public land mobile network (public land mobile network, PLMN), a transmission reception point (transmission and reception point, TRP), or the like.

The terminal is an entity that is on a user side and that is configured to receive a signal, or send a signal, or receive a signal and send a signal. The terminal is configured to provide a user with one or more of a voice service and a data connectivity service. The terminal may also be referred to as user equipment (user equipment, UE), a terminal device, an access terminal, a subscriber unit, a subscriber station, a mobile station, a remote station, a remote terminal, a mobile device, a user terminal, a wireless communications device, a user agent, or a user apparatus. The terminal may be a mobile station (mobile station, MS), a subscriber unit (subscriber unit), an unmanned aerial vehicle, an IoT device, a station (station, ST) in a wireless local area network (wireless local area networks, WLAN), a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device with a wireless communication function, a computing device or another processing device connected to a wireless modem, a vehicle-mounted device, or a wearable device (which may also be referred to as a wearable intelligent device). The terminal may alternatively be a terminal in a next generation communications system, for example, a terminal in a 5G system, a terminal in a future evolved PLMN, or a terminal in an NR system.

The technical solutions provided in the embodiments of this application may be applied to a plurality of communications scenarios, for example, scenarios such as machine-to-machine (machine to machine, M2M) communication, macro-micro communication, enhanced mobile broadband (enhanced mobile broadband, eMBB) communication, ultra-reliable and low-latency communication (ultra-reliable & low latency communication, URLLC), massive machine type communication (massive machine type communication, mMTC) communication, vehicle-to-everything (vehicle to everything, V2X) communication, and device-to-device (device to device, D2D) direct communication.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

To facilitate understanding of this application, some concepts or content in the embodiments of this application is briefly described herein.

1. SR

The SR is a manner in which a terminal applies to a network device for a resource for new data transmission.

It may be understood that if the terminal has no uplink data or sidelink data to be transmitted, the network device does not need to allocate an uplink resource or a sidelink resource to the terminal. Otherwise, a resource waste is caused. Therefore, the terminal needs to notify the network device whether the terminal has uplink data or sidelink data that needs to be transmitted, so that the network device determines whether to allocate an uplink resource or a sidelink resource to the terminal. A function of the SR is to notify the network device that an uplink resource is required, but does not notify the network device of an amount of uplink data or sidelink data that needs to be sent (which is reported by using a BSR). After the network device receives the SR, a quantity of uplink resources allocated to the terminal depends on implementation of the network device. A common practice is to allocate at least sufficient resources for sending the BSR by the terminal.

The SR may be triggered by an uplink BSR, or may be triggered by a sidelink BSR. In some descriptions of the embodiments of this application, an SR triggered by the uplink BSR is referred to as a UL SR, and an SR triggered by the sidelink BSR is referred to as an SL SR.

2. BSR

The BSRs may include an uplink BSR and a sidelink BSR.

The uplink BSR is used to provide a first buffer status of a terminal for a network device. The first buffer status is information about a data amount of data that is stored by the terminal in an uplink buffer and that needs to be sent. The sidelink BSR is used to provide a second buffer status of the terminal for the network device. The second buffer status is information about a data amount of data that is stored by the terminal in a sidelink buffer and that needs to be sent.

In NR, there are four types of uplink BSRs: a long BSR, a short BSR, a long truncated (truncated) BSR, and a short truncated BSR. The long BSR and the short BSR may be collectively referred to as a non-truncated uplink BSR, and the long truncated BSR and the short truncated BSR may be collectively referred to as a truncated uplink BSR.

The terminal has a plurality of logical channels, and each logical channel corresponds to one buffer. One logical channel group includes at least one logical channel, and a buffer size corresponding to one logical channel group is a sum of buffer sizes corresponding to at least one logical channel included in the logical channel group. The non-truncated uplink BSR includes buffer sizes (buffer size) corresponding to all logical channel groups of the terminal, and the truncated uplink BSR includes buffer sizes corresponding to some logical channel groups of the terminal.

The buffer size refers to an amount of data in a buffer, and a concept of the buffer size is similar to a concept of a buffer status.

3. MAC PDU

Figure 2:
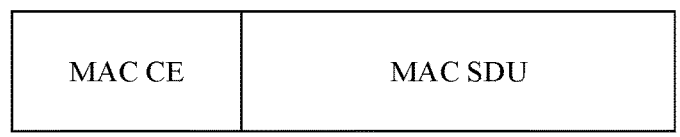
FIG. 2 is a schematic composition diagram of a MAC PDU according to an embodiment of this application.

Referring to FIG. 2, the MAC PDU in the embodiments of this application includes at least a MAC CE and a MAC SDU, and a BSR is one type of the MAC CE.

Signaling that carries the BSR is referred to as a BSR MAC CE. For example, signaling that carries a non-truncated uplink BSR may be referred to as a non-truncated uplink BSR MAC CE. Signaling that carries a non-truncated sidelink BSR may be referred to as a non-truncated sidelink BSR MAC CE. Signaling that carries a long BSR may be referred to as a long BSR MAC CE. Signaling that carries a short BSR may be referred to as a short BSR MAC CE.

4. Existing Uplink Data Resource Request Mechanism

Figure 3:
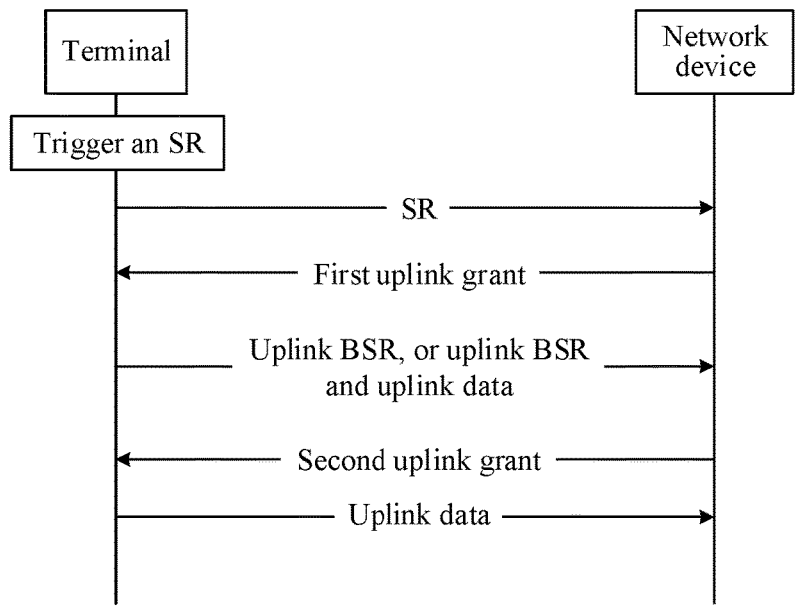
FIG. 3 is a schematic diagram of an uplink grant request process according to an embodiment of this application.

Referring to FIG. 3, when a terminal has uplink data that needs to be sent but does not have an available UL grant, the terminal needs to trigger and send an SR, and a network device allocates a first UL grant to the terminal based on the received SR. After receiving the first UL grant, the terminal may send an uplink BSR to the network device by using the first UL grant. If there is still a remaining resource after the first UL grant accommodates the uplink BSR, the terminal may further accommodate uplink data on the remaining resource. The network device allocates a second UL grant to the terminal based on the received uplink BSR, and the terminal sends the uplink data by using the second UL grant.

5. Existing Sidelink Data Resource Request Mechanism

Figure 4:
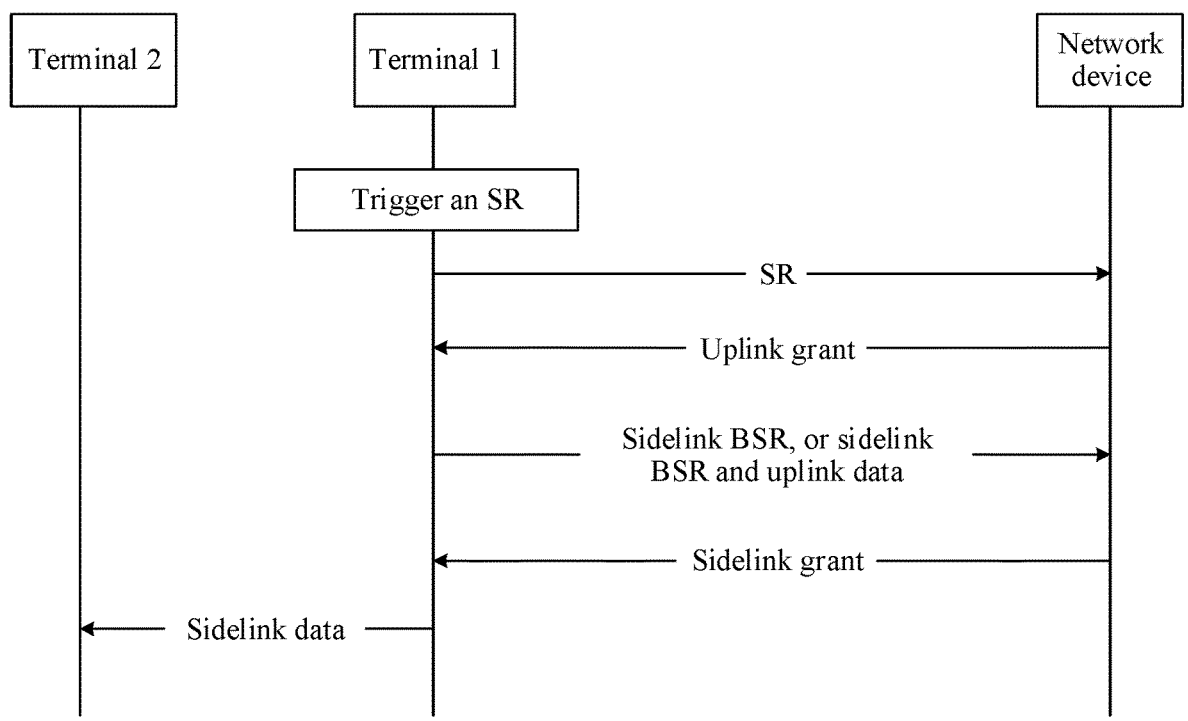
FIG. 4 is a schematic diagram of a sidelink grant request process according to an embodiment of this application.

Referring to FIG. 4, when a terminal 1 has sidelink data to be sent to a terminal 2 but does not have an available SL grant, the terminal 1 needs to trigger and send an SR, and a network device allocates a UL grant to the terminal 1 based on the received SR. After receiving the UL grant, the terminal 1 may send a sidelink BSR to the network device by using the UL grant. If there is still a remaining resource after the UL grant accommodates the sidelink BSR, the terminal 1 may further accommodate uplink data on the remaining resource. The network device allocates an SL grant to the terminal 1 based on the received sidelink BSR, and the terminal 1 sends sidelink data to the terminal 2 by using the SL grant.

Based on the descriptions in 4 and 5, in the prior art, during logical channel priority processing, a priority of the uplink BSR is higher than a priority of the sidelink BSR, and the priority of the sidelink BSR is higher than a priority of the uplink data. To be specific, when having the UL grant, the terminal preferentially accommodates the uplink BSR. If there is still a remaining resource after the uplink BSR is accommodated, the terminal accommodates the sidelink BSR. If there is still a remaining resource after the sidelink BSR is accommodated, the terminal accommodates the uplink data. The uplink BSR may also be replaced with an uplink BSR MAC CE, and the sidelink BSR may also be replaced with a sidelink BSR MAC CE.

6. Existing SR Cancellation Mechanism

After an SR is triggered, the SR is considered as a pending (pending) SR until the SR is canceled. A terminal may cancel the pending SR when a specific condition is met. Specifically, for SRs triggered by different link BSRs in different communications systems, cancellation mechanisms are different, and are separately described below.

(1) Cancellation Mechanism for an SR Triggered by an Uplink BSR in an LTE System When a MAC PDU is assembled, if the MAC PDU includes an uplink BSR MAC CE, and the uplink BSR MAC CE includes a buffer status up to a last event that triggers an uplink BSR, the terminal cancels all pending SRs.

Alternatively, when a UL grant can accommodate all available pending data, the terminal cancels all pending SRs.

(2) Cancellation Mechanism for an SR Triggered by a Sidelink BSR in an LTE System When a MAC PDU is assembled, if the MAC PDU includes a sidelink BSR MAC CE, and the sidelink BSR MAC CE includes a buffer status up to a last event that triggers a sidelink BSR, the terminal cancels all pending SRs.

Alternatively, if all pending SRs are triggered by a sidelink BSR, when a MAC PDU is assembled, if the MAC PDU includes a sidelink BSR MAC CE, and the sidelink BSR MAC CE includes a buffer status up to a last event that triggers the sidelink BSR, the terminal cancels all the pending SRs.

Alternatively, if all pending SRs are triggered by a sidelink BSR, the terminal cancels all the pending SRs when autonomous resource selection is configured at an upper layer.

Alternatively, when a UL grant can accommodate all available pending data, the terminal cancels all pending SRs.

(3) Cancellation Mechanism for an SR Triggered by an Uplink BSR in an NR System

When a MAC PDU is transmitted, if the MAC PDU includes a long BSR MAC CE or a short BSR MAC CE, and the long BSR MAC CE or the short BSR MAC CE includes a buffer status up to a last event that triggers an uplink BSR, the terminal cancels all pending SRs that are triggered before the MAC PDU is assembled.

Alternatively, when a UL grant can accommodate all available pending data, the terminal cancels all pending SRs.

7. SR Configuration and SR Resource in NR

In NR, to enable a network device to learn, after receiving an SR sent by a terminal, whether the SR is triggered by an uplink BSR or a sidelink BSR, a dedicated SR configuration and a dedicated SR resource (or referred to as an SR physical resource) may be configured for a sidelink.

The SR configuration includes the following parameters: an SR identifier (schedulingRequestId), an SR prohibit timer (sr-ProhibitTimer), and a maximum quantity of SR transmissions (sr-TransMax). The SR identifier is used to identify an SR configuration, the SR prohibit timer is used to control a time interval of SR transmission, and the maximum quantity of SR transmissions is used to control a maximum quantity of SR transmissions.

The SR resource includes the following parameters: an SR resource identifier (schedulingRequestResourceId), a periodicity and an offset (periodicityAndOffset), and a physical uplink control channel (physical uplink control channel, PUCCH) resource identifier (PUCCH-ResourceId). The SR resource identifier is used to identify a configuration of an SR resource, the periodicity and the offset are used to determine a position of a time domain resource in the SR resource, and the PUCCH resource identifier is used to determine a position of a frequency domain resource in the SR resource.

In NR, one terminal may have a plurality of SR resources and a plurality of SR configurations in one cell, and one SR configuration may be associated with a plurality of SR resources. An SL SR and a UL SR may correspond to different SR configurations and/or different SR resources, or may correspond to a same SR configuration and/or a same SR resource. If the SL SR and the UL SR correspond to the different SR configurations and/or the different SR resources, the network device may determine, based on a position of an SR resource for sending an SR, whether the SR is a UL SR or an SL SR.

In addition, one SR resource may be associated with one logical channel, and different logical channels may have different latency requirements. In this case, the network device may further determine, based on the position of the SR resource for sending the SR, a latency of data carried on a resource requested by the SR, to determine whether to immediately allocate a resource to the terminal. For example, when receiving a UL SR carried on an SR resource corresponding to a logical channel having a relatively high latency requirement, the network device may immediately allocate a UL grant to the terminal. When receiving an SL SR carried on an SR resource corresponding to a logical channel having a relatively high latency requirement, the network device may immediately allocate an SL grant to the terminal.

Based on the SR configuration and the SR resource in NR, specific problems exist when an existing SR cancellation mechanism is used in the NR system to cancel the SL SR. For details, refer to analysis in Example 1 to Example 4.

Example 1

In the existing SR cancellation mechanism, when a UL grant can accommodate all available pending data, the terminal can cancel all pending SRs. Based on the SR configuration and the SR resource in NR, if this method is used to cancel the SL SR, a transmission latency of sidelink data may increase, and a service requirement cannot be met.

Figure 5:
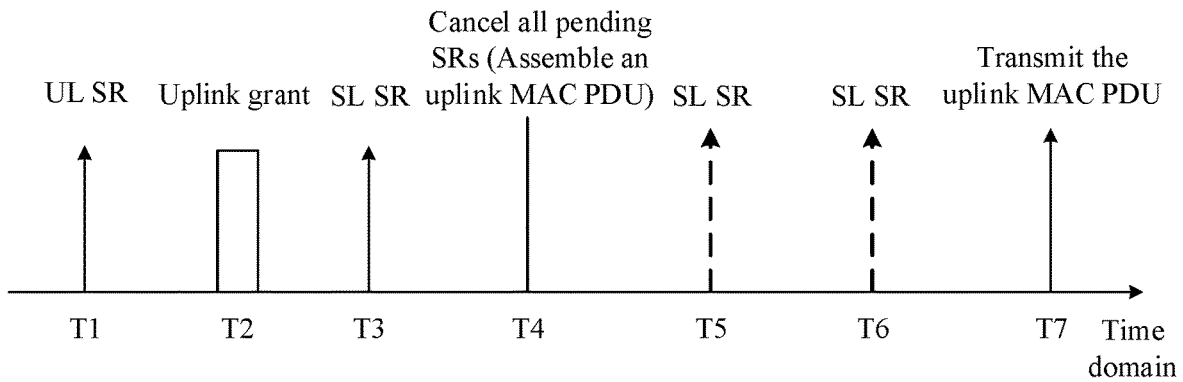
FIG. 5 to FIG. 8 each are a schematic diagram of an information sending time according to an embodiment of this application.

For example, as shown in FIG. 5, the terminal sends a UL SR to the network device at T1, and the network device allocates a UL grant to the terminal at T2. In this case, the UL grant can accommodate an uplink BSR and all available pending data. The terminal further sends an SL SR at T3 and assembles a MAC PDU at T4. In this case, the terminal cancels the UL SR and the SL SR at T4 according to the existing cancellation mechanism. Because a priority of a sidelink BSR is higher than a priority of uplink data, the terminal first accommodates the sidelink BSR in the MAC PDU, and then accommodates the uplink data. In this case, if the MAC PDU is transmitted at T7, it means that the network device allocates an SL grant to the terminal only after T7. If sidelink data is data having a relatively high latency requirement, the terminal may send an SL RS to the network device at T5 or T6 by using an SR resource (a logical channel associated with the SR resource has a relatively high latency requirement) dedicated to sending the SL SR, to request the network device to immediately allocate a transmission resource to the sidelink data. However, because the terminal cancels the SL RS at T4, the terminal cannot send the SL RS at T5 or T6 any more. Consequently, a transmission latency of the sidelink data increases, and a service requirement cannot be met.

Example 2

In the existing SR cancellation mechanism in NR, when a MAC PDU is transmitted, if the MAC PDU includes a non-truncated uplink BSR MAC CE, and the non-truncated uplink BSR MAC CE includes a buffer status up to a last event that triggers an uplink BSR, the terminal cancels all pending SRs that are triggered before the MAC PDU is assembled. Based on the SR configuration and the SR resource in NR, if this method is used to cancel the SL SR, a transmission latency of sidelink data may increase, and a service requirement cannot be met.

Figure 6:
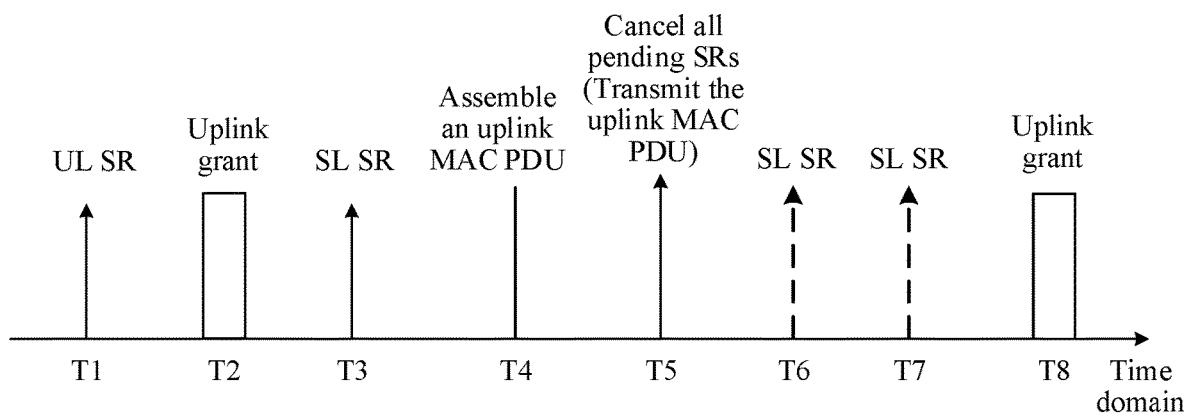

For example, as shown in FIG. 6, the terminal sends a UL SR to the network device at T1, and the network device allocates a UL grant to the terminal at T2. The terminal further sends an SL SR to the network device at T3 because sidelink data arrives. The terminal assembles a MAC PDU at T4 and transmits the MAC PDU at T5 by using the UL grant received at the moment T2. If the MAC PDU includes a non-truncated uplink BSR MAC CE, the terminal cancels the UL SR and the SL SR at T5 according to the existing cancellation mechanism. If the network device allocates a UL grant to the terminal at T8 based on the uplink BSR, when the MAC PDU does not include a non-truncated sidelink BSR MAC CE, the terminal can report a sidelink BSR only at T8. In this case, the network device definitely needs to allocate an SL grant to the terminal after T8. However, the terminal may originally transmit an SL SR between T5 and T8 (for example, at T6 or T7) by using a resource dedicated to transmitting the SL SR, to request the network device to immediately allocate an SL grant to the terminal, to reduce a waiting latency. It can be learned that due to the existing cancellation mechanism, a transmission latency of sidelink data of the terminal increases, and a service requirement cannot be met.

Example 3

Figure 7:
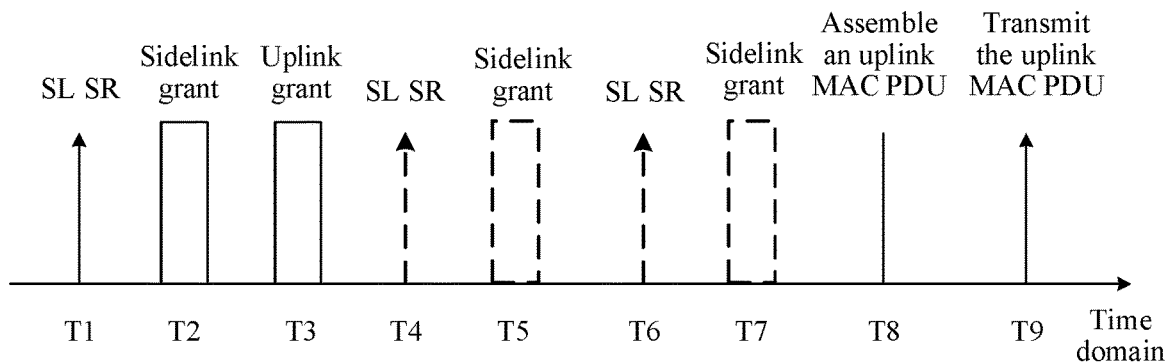

Referring to FIG. 7, the terminal sends an SL SR to the network device at T1. If a logical channel corresponding to an SR resource for sending the SL SR has a relatively high latency requirement, the network device allocates an SL grant (used by the terminal to transmit sidelink data in a timely manner) to the terminal at T2, and allocates a UL grant (used to send a sidelink BSR) to the terminal at T3. The network device assemblies an uplink MAC PDU at T8, where the MAC PDU includes a sidelink BSR, and transmits the uplink MAC PDU at T9.

In this case, it may be understood that if the SL grant allocated by the network device to the terminal at T2 can accommodate all sidelink data, the terminal needs to cancel the SL SR. Otherwise, the terminal cancels the SL SR only after an uplink MAC PDU can include a sidelink BSR (namely, at T8). In this case, between T3 and T8, the terminal may continue to send an SL SR at T4 and T6, causing unnecessary SR transmission. In addition, the network device may continue to allocate an SL grant to the terminal at T5 and T7, causing a resource waste.

Example 4

Figure 8:
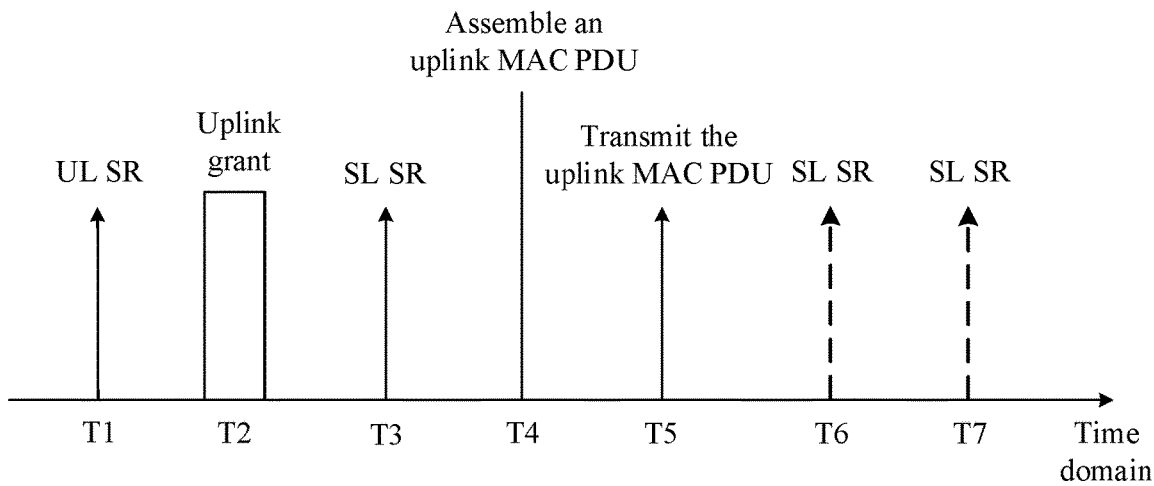

Refer to FIG. 8. The terminal sends a UL SR to the network device at T1, and the network device allocates a UL grant to the terminal at T2. The terminal further sends an SL SR to the network device at T3 because sidelink data arrives. The terminal assemblies an uplink MAC PDU at T4, and sends the uplink MAC PDU at T5 by using the UL grant received at the moment T2. The uplink MAC PDU includes a sidelink BSR, but does not include an uplink BSR. Therefore, the terminal does not cancel the SL SR at T5. In this case, the terminal sends the SL SR at T6 and T7 that is after T6. However, in this case, because the terminal has requested, by using the sidelink BSR in the uplink MAC PDU, the network device to allocate an SL grant, the terminal does not need to send the SL SR to the network device again, in other words, subsequent sending of the SL SR at T6 and T7 is unnecessary. Consequently, SR resources are wasted.

To resolve the foregoing problems, an embodiment of this application provides a pending SR cancellation method. The following separately provides descriptions in Embodiment 1 and Embodiment 2.

Embodiment 1

Figure 9:
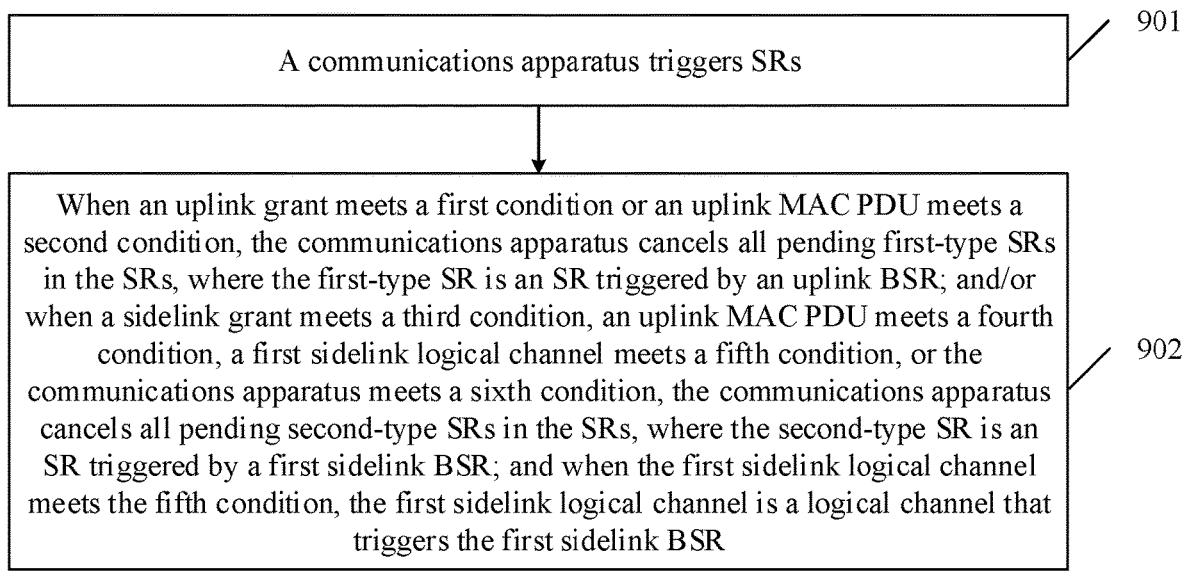
FIG. 9 and FIG. 10 each are a flowchart of a pending SR cancellation method according to an embodiment of this application.

Embodiment 1 provides a pending SR cancellation method. As shown in FIG. 9, the method includes the following steps.

901: A communications apparatus triggers SRs.

Optionally, the communications apparatus may be a terminal, or may be a chip that can be configured to perform the method provided in Embodiment 1.

902: When a UL grant meets a first condition or an uplink MAC PDU meets a second condition, the communications apparatus cancels all pending first-type SRs in the SRs, where the first-type SR is an SR triggered by an uplink BSR; and/or when an SL grant meets a third condition, an uplink MAC PDU meets a fourth condition, a first sidelink logical channel meets a fifth condition, or the communications apparatus meets a sixth condition, the communications apparatus cancels all pending second-type SRs in the SRs, where the second-type SR is an SR triggered by a first sidelink BSR; and when the first sidelink logical channel meets the fifth condition, the first sidelink logical channel is a logical channel that triggers the first sidelink BSR.

According to the method provided in Embodiment 1, the communications apparatus may independently cancel the first-type SR and the second-type SR. In this case, when canceling the first-type SR, the communications apparatus may not cancel the second-type SR, so that when sidelink data has a relatively high latency requirement, the communications apparatus sends an SL RS to a network device by using an SR resource dedicated to sending an SL SR (a logical channel associated with the SR resource has a relatively high latency requirement), to request the network device to immediately allocate a transmission resource to the sidelink data, so as to ensure that a low-latency transmission requirement of the sidelink data is met.

The following specifically describes the foregoing method in a plurality of parts. One part is used to specifically describe one of the first condition to the sixth condition and a further solution under the condition.

First Part

Optionally, that the UL grant meets the first condition includes: The UL grant is sufficient to accommodate all available pending uplink data. It may be understood that when the UL grant meets the first condition, the communications apparatus only needs to send all the available pending uplink data by using the UL grant, and does not need to send the first-type SR to the network device to request an uplink transmission resource. Therefore, the communications apparatus may cancel the pending first-type SR, to avoid a resource waste caused by sending of the first-type SR.

According to the optional method, in a first possible implementation, when the UL grant meets the first condition, the communications apparatus cancels only the first-type SR, and the terminal does not cancel a pending second-type SR even if there is the pending second-type SR. In this case, if sidelink data having a relatively high latency requirement needs to be transmitted, the terminal may request, by using an SR resource dedicated to transmitting an SL SR, the network device to immediately allocate an SL grant. Therefore, a transmission latency requirement of the sidelink data is met.

In a second possible implementation, when the UL grant meets the first condition, the method further includes: The communications apparatus cancels all pending first sub-type SRs of a second type in the SRs. Further, the communications apparatus cancels only the first-type SR and the first sub-type SR of the second type, and does not cancel another pending sub-type SR of the second type (for example, a second sub-type SR of the second type, a third sub-type SR of the second type, or a fourth sub-type SR of the second type in the following descriptions) even if there is the another pending sub-type SR.

The first sub-type SR of the second type belongs to the second-type SR (in other words, the second-type SR includes the first sub-type SR of the second type), the first sub-type SR of the second type is an SR triggered by a second sidelink BSR, a second sidelink logical channel that triggers the second sidelink BSR meets a seventh condition, the second sidelink BSR belongs to the first sidelink BSR, and the seventh condition is: at least one of an SR configuration to which the second sidelink logical channel is mapped and an SR resource to which the second sidelink logical channel is mapped is also mapped to at least one uplink logical channel; or a configuration corresponding to the second sidelink logical channel or an SR configuration to which the second sidelink logical channel is mapped includes first indication information, where the first indication information indicates to cancel, when the UL grant meets the first condition, the SR triggered by the second sidelink BSR.

In the second possible implementation, in a first case, if the at least one of the SR configuration to which the second sidelink logical channel is mapped and the SR resource to which the second sidelink logical channel is mapped is also mapped to the at least one uplink logical channel, the network device cannot determine, based on the SR resource for sending the SR, whether the received SR is an SL SR or a UL SR. In this case, because a priority of a sidelink BSR is higher than a priority of uplink data, if the UL grant meets the first condition, it indicates that the UL grant may also be used to send the sidelink BSR, the network device only needs to allocate an SL grant to the communications apparatus based on the sidelink BSR, and the communications apparatus does not need to send an SL SR. Therefore, the communications apparatus may cancel the first sub-type SR of the second type.

In a second case, the communications apparatus may cancel the first sub-type SR of the second type according to an indication of the first indication information. The first indication information may be specifically implemented in two manners. In a first implementation, optionally, the configuration corresponding to the second sidelink logical channel or the SR configuration to which the second sidelink logical channel is mapped includes one parameter or one field. When the parameter or the field exists, it indicates that the SR triggered by the second sidelink BSR is canceled when the UL grant meets the first condition; or when the parameter or the field does not exist, it indicates that the SR triggered by the second sidelink BSR is not canceled when the UL grant meets the first condition, or vice versa. In a second implementation, the configuration corresponding to the second sidelink logical channel or the SR configuration to which the second sidelink logical channel is mapped includes one parameter or one field. A different value of the parameter or the field indicates different information. For example, when a value of the parameter or the field is true or 1, the parameter or the field indicates to cancel, when the UL grant meets the first condition, the SR triggered by the second sidelink BSR. When a value of the parameter or the field is false or 0, the parameter or the field indicates not to cancel, when the UL grant meets the first condition, the SR triggered by the second sidelink BSR.

In the second case, optionally, the method further includes the following steps.

(11) The communications apparatus sends an identifier of a first QoS flow and a QoS parameter corresponding to the first QoS flow to the network device, where data carried in the first QoS flow is sidelink data. Correspondingly, the network device receives the identifier of the first QoS flow and the QoS parameter corresponding to the first QoS flow from the communications apparatus.

In the embodiments of this application, the QoS parameter includes but is not limited to a guaranteed transmission rate, a maximum transmission rate, a latency requirement, a reliability requirement, a priority, and a communication distance. Further, the QoS parameter may also be understood as an index value corresponding to a specific QoS parameter.

(12) The network device sends, to the communications apparatus based on the identifier of the first QoS flow and the QoS parameter corresponding to the first QoS flow, the configuration corresponding to the second sidelink logical channel or the SR configuration to which the second sidelink logical channel is mapped, where the configuration corresponding to the second sidelink logical channel or the SR configuration to which the second sidelink logical channel is mapped includes the first indication information, and the second sidelink logical channel is used to transmit the data carried in the first QoS flow. Correspondingly, the communications apparatus receives, from the network device, the configuration corresponding to the second sidelink logical channel or the SR configuration to which the second sidelink logical channel is mapped.

In a specific implementation of step (12), the network device may determine, based on the QoS parameter, whether to use the configuration corresponding to the second sidelink logical channel or the SR configuration to which the second sidelink logical channel is mapped to carry the first indication information. For example, the QoS parameter may include a latency requirement of the first QoS flow. When the latency requirement is relatively high (for example, a data transmission latency is required to be less than 2 milliseconds), the configuration corresponding to the second sidelink logical channel or the SR configuration to which the second sidelink logical channel is mapped may not include the first indication information; or when the latency requirement is relatively low (for example, a data transmission latency is required to be less than 100 milliseconds), the configuration corresponding to the second sidelink logical channel or the SR configuration to which the second sidelink logical channel is mapped may include the first indication information, or vice versa.

Optionally, the method further includes: The network device sends a mapping relationship between the identifier of the first QoS flow and an identifier of a second sidelink radio bearer, an identifier of the second sidelink logical channel, or an identifier of a second sidelink logical channel group to the terminal based on the QoS parameter corresponding to the first QoS flow. Correspondingly, the terminal receives the mapping relationship between the identifier of the first QoS flow and the identifier of the second sidelink radio bearer, the identifier of the second sidelink logical channel, or the identifier of the second sidelink logical channel group from the network device.

The second sidelink logical channel is used to transmit the data carried in the first QoS flow, the second sidelink radio bearer is a sidelink radio bearer to which the second sidelink logical channel belongs, and the second sidelink logical channel group is a sidelink logical channel group to which the second sidelink logical channel belongs. One QoS flow corresponds to one sidelink radio bearer, and one sidelink radio bearer corresponds to one sidelink logical channel.

If the identifier of the second sidelink radio bearer or the identifier of the second sidelink logical channel is received, the terminal may determine the second sidelink logical channel based on the identifier. If the identifier of the second sidelink logical channel group is received, the terminal allocates an identifier to the second sidelink logical channel, and considers that the second sidelink logical channel belongs to the second sidelink logical channel group.

Second Part

Optionally, that the uplink MAC PDU meets the second condition includes: The uplink MAC PDU includes a non-truncated uplink BSR MAC CE, where the non-truncated uplink BSR MAC CE includes a buffer status of the communications apparatus up to (and including) a last event that triggers the uplink BSR before the uplink MAC PDU is assembled. In this case, in a specific implementation, step 902 may include: When the uplink MAC PDU is transmitted, the communications apparatus cancels all pending first-type SRs that are triggered before the uplink MAC PDU is assembled.

Further, that the uplink MAC PDU meets the second condition includes: The uplink MAC PDU includes only a non-truncated uplink BSR MAC CE, where the non-truncated uplink BSR MAC CE includes a buffer status of the communications apparatus up to (and including) a last event that triggers the uplink BSR before the uplink MAC PDU is assembled. In this case, in a specific implementation, step 902 may include: When the uplink MAC PDU is transmitted, the communications apparatus cancels only all pending first-type SRs that are triggered before the uplink MAC PDU is assembled.

In the second part, if a buffer status of the communications apparatus is 1000 bits before the last event that triggers the uplink BSR, and a buffer status of the communications apparatus is 1200 bits after the last event that triggers the uplink BSR, the buffer status included in the non-truncated uplink BSR MAC CE is 1200 bits.

It may be understood that if the uplink MAC PDU includes the non-truncated uplink BSR MAC CE, it indicates that the uplink MAC PDU includes buffer statuses of all uplink logical channel groups, and the included buffer statuses are latest buffer statuses. In this case, the network device only needs to allocate a UL grant to the communications apparatus by using the uplink BSR MAC CE in the uplink MAC PDU, and the communications apparatus does not need to send a UL SR to request an uplink transmission resource. Therefore, the communications apparatus may cancel the pending first-type SR.

According to the optional method, in a first possible implementation, when the uplink MAC PDU meets the second condition, the communications apparatus cancels only the first-type SR, and the terminal does not cancel a pending second-type SR even if there is the pending second-type SR. If sidelink data having a relatively high latency requirement needs to be transmitted, the terminal may request, by using an SR resource dedicated to transmitting an SL SR, the network device to immediately allocate an SL grant. Therefore, a transmission latency requirement of the sidelink data is met.

In a second possible implementation, when the uplink MAC PDU meets the second condition, the method further includes: When the uplink MAC PDU is transmitted, the communications apparatus cancels all pending second sub-type SRs of the second type that are triggered before the uplink MAC PDU is assembled. Further, that the uplink MAC PDU meets the second condition includes: The uplink MAC PDU includes only a non-truncated uplink BSR MAC CE, where the non-truncated uplink BSR MAC CE includes a buffer status of the communications apparatus up to (and including) a last event that triggers the uplink BSR before the uplink MAC PDU is assembled. In this case, in a specific implementation, step 902 may include: When the uplink MAC PDU is transmitted, the communications apparatus cancels only all pending first-type SRs and all pending second sub-type SRs of the second type that are triggered before the uplink MAC PDU is assembled, and does not cancel another pending sub-type SR of the second type (for example, the first sub-type SR of the second type in the foregoing descriptions, a third sub-type SR of the second type in the following descriptions, or a fourth sub-type SR of the second type in the following descriptions) even if there is the another pending sub-type SR.

The second sub-type SR of the second type belongs to the second-type SR (in other words, the second-type SR includes the second sub-type SR of the second type), the second sub-type SR of the second type is an SR triggered by a third sidelink BSR, a third sidelink logical channel that triggers the third sidelink BSR meets an eighth condition, the third sidelink BSR belongs to the first sidelink BSR, and the eighth condition is: at least one of an SR configuration to which the third sidelink logical channel is mapped and an SR resource to which the third sidelink logical channel is mapped is also mapped to at least one uplink logical channel; or a configuration corresponding to the third sidelink logical channel or an SR configuration to which the third sidelink logical channel is mapped includes second indication information, where the second indication information indicates to cancel, when the uplink MAC PDU meets the second condition, the SR triggered by the third sidelink BSR.

In the second possible implementation, in a first case, if the at least one of the SR configuration to which the third sidelink logical channel is mapped and the SR resource to which the third sidelink logical channel is mapped is also mapped to the at least one uplink logical channel, the network device cannot determine, based on the SR resource for sending the SR, whether the received SR is an SL SR or a UL SR. In this case, because a priority of a sidelink BSR is higher than a priority of uplink data, the communications apparatus may send the sidelink BSR by using a UL grant requested by the uplink BSR in the uplink MAC PDU. In other words, the communications apparatus does not need to send an SL SR to request an uplink resource for transmitting the sidelink BSR. Therefore, the communications apparatus may cancel the second sub-type SR of the second type.

In a second case, the communications apparatus may cancel the second sub-type SR of the second type according to an indication of the second indication information. The second indication information may be specifically implemented in two manners. In a first implementation, optionally, the configuration corresponding to the third sidelink logical channel or the SR configuration to which the third sidelink logical channel is mapped includes one parameter or one field. When the parameter or the field exists, it indicates that the SR triggered by the third sidelink BSR is canceled when the uplink MAC PDU meets the second condition; or when the parameter or the field does not exist, it indicates that the SR triggered by the third sidelink BSR is not canceled when the uplink MAC PDU meets the second condition, or vice versa. In a second implementation, the configuration corresponding to the third sidelink logical channel or the SR configuration to which the third sidelink logical channel is mapped includes one parameter or one field. A different value of the parameter or the field indicates different information. For example, when a value of the parameter or the field is true or 1, the parameter or the field indicates to cancel, when the uplink MAC PDU meets the second condition, the SR triggered by the third sidelink BSR. When a value of the parameter or the field is false or 0, the parameter or the field indicates not to cancel, when the uplink MAC PDU meets the second condition, the SR triggered by the third sidelink BSR.

In the second case, optionally, the method further includes the following steps.

(21) The communications apparatus sends an identifier of a first QoS flow and a QoS parameter corresponding to the first QoS flow to the network device, where data carried in the first QoS flow is sidelink data. Correspondingly, the network device receives the identifier of the first QoS flow and the QoS parameter corresponding to the first QoS flow from the communications apparatus.

(22) The network device sends, to the communications apparatus based on the identifier of the first QoS flow and the QoS parameter corresponding to the first QoS flow, the configuration corresponding to the third sidelink logical channel or the SR configuration to which the third sidelink logical channel is mapped, where the configuration corresponding to the third sidelink logical channel or the SR configuration to which the third sidelink logical channel is mapped includes the second indication information, and the third sidelink logical channel is used to transmit the data carried in the first QoS flow. Correspondingly, the communications apparatus receives, from the network device, the configuration corresponding to the third sidelink logical channel or the SR configuration to which the third sidelink logical channel is mapped.

In a specific implementation of step (22), the network device may determine, based on the QoS parameter, whether to use the configuration corresponding to the third sidelink logical channel or the SR configuration to which the third sidelink logical channel is mapped to carry the second indication information. For example, the QoS parameter may include a latency requirement of the first QoS flow. When the latency requirement is relatively high (for example, a data transmission latency is required to be less than 2 milliseconds), the configuration corresponding to the third sidelink logical channel or the SR configuration to which the third sidelink logical channel is mapped may not include the second indication information; or when the latency requirement is relatively low (for example, a data transmission latency is required to be less than 100 milliseconds), the configuration corresponding to the third sidelink logical channel or the SR configuration to which the third sidelink logical channel is mapped may include the second indication information, or vice versa.

Optionally, the method further includes: The network device sends a mapping relationship between the identifier of the first QoS flow and an identifier of a third sidelink radio bearer, an identifier of the third sidelink logical channel, or an identifier of a third sidelink logical channel group to the terminal based on the QoS parameter corresponding to the first QoS flow. Correspondingly, the terminal receives the mapping relationship between the identifier of the first QoS flow and the identifier of the third sidelink radio bearer, the identifier of the third sidelink logical channel, or the identifier of the third sidelink logical channel group from the network device.

The third sidelink logical channel is used to transmit the data carried in the first QoS flow, the third sidelink radio bearer is a sidelink radio bearer to which the third sidelink logical channel belongs, and the third sidelink logical channel group is a sidelink logical channel group to which the third sidelink logical channel belongs. One QoS flow corresponds to one sidelink radio bearer, and one sidelink radio bearer corresponds to one sidelink logical channel.

If the identifier of the third sidelink radio bearer or the identifier of the third sidelink logical channel is received, the terminal may determine the third sidelink logical channel based on the identifier. If the identifier of the third sidelink logical channel group is received, the terminal allocates an identifier to the third sidelink logical channel, and considers that the third sidelink logical channel belongs to the third sidelink logical channel group.

Third Part

Optionally, that the SL grant meets the third condition includes: The SL grant is sufficient to accommodate all available pending sidelink data. In the optional method, when the SL grant is sufficient to accommodate all the available pending sidelink data, the communications apparatus cancels the second-type SR, to avoid problems in Example 3 that the SL SR is sent for a plurality of times and the network device repeatedly allocates the SL grant to the communications apparatus, and avoid the resource waste in Example 3.

It may be understood that when the SL grant meets the third condition, the communications apparatus only needs to send all the available pending sidelink data by using the SL grant, and does not need to send the second-type SR to the network device to request a sidelink transmission resource. Therefore, the communications apparatus may cancel the pending second-type SR.

When the SL grant meets the third condition, the communications apparatus cancels only the second-type SR, and the terminal does not cancel a pending first-type SR even if there is the pending first-type SR.

Further, optionally, the second-type SR includes a third sub-type SR of the second type, the second-type SR is the third sub-type SR of the second type, the third sub-type SR of the second type is an SR triggered by a fourth sidelink BSR, a fourth sidelink logical channel that triggers the fourth sidelink BSR meets a ninth condition, the fourth sidelink BSR belongs to the first sidelink BSR, and the ninth condition is: the fourth sidelink logical channel and any uplink logical channel are mapped to different SR configurations and/or different SR resources; or a configuration corresponding to the fourth sidelink logical channel or an SR configuration to which the fourth sidelink logical channel is mapped includes third indication information, where the third indication information indicates to cancel, when the SL grant meets the third condition, the SR triggered by the fourth sidelink BSR.

The fourth sidelink BSR is triggered by the fourth sidelink logical channel. That the fourth sidelink BSR is triggered by the fourth sidelink logical channel includes: triggering the sidelink BSR when data arrives on the fourth sidelink logical channel; or triggering the fourth sidelink BSR when a BSR retransmission timer expires, where the fourth sidelink logical channel is a sidelink logical channel with a highest priority in sidelink logical channels having data available for transmission when the fourth sidelink BSR is triggered.

According to the optional method, the communications apparatus may cancel only the third sub-type SR of the second type. Another sub-type SR of the second type may be canceled based on another condition.

In a first case, if the fourth sidelink logical channel and the any uplink logical channel are mapped to the different SR configurations and/or the different SR resources, the network device may determine, based on the SR resource for sending the SR, that the received SR is an SL SR, and the network device may directly allocate an SL grant to the terminal. In this case, if the SL grant can accommodate all the available pending sidelink data, the network device needs to cancel the third sub-type SR of the second type. Otherwise, repeated SR transmission and repeated SL grant allocation occur, causing a resource waste.

In a second case, the communications apparatus may cancel the third sub-type SR of the second type according to an indication of the third indication information. The third indication information may be specifically implemented in two manners. In a first implementation, optionally, the configuration corresponding to the fourth sidelink logical channel or the SR configuration to which the fourth sidelink logical channel is mapped includes one parameter or one field. When the parameter or the field exists, it indicates that the SR triggered by the fourth sidelink BSR is canceled when the SL grant meets the third condition; or when the parameter or the field does not exist, it indicates that the SR triggered by the fourth sidelink BSR is not canceled when the SL grant meets the third condition, or vice versa. In a second implementation, the configuration corresponding to the fourth sidelink logical channel or the SR configuration to which the fourth sidelink logical channel is mapped includes one parameter or one field. A different value of the parameter or the field indicates different information. For example, when a value of the parameter or the field is true or 1, the parameter or the field indicates to cancel, when the SL grant meets the third condition, the SR triggered by the fourth sidelink BSR. When a value of the parameter or the field is false or 0, the parameter or the field indicates not to cancel, when the SL grant meets the third condition, the SR triggered by the fourth sidelink BSR.

In the second case, optionally, the method further includes the following steps.

(31) The communications apparatus sends an identifier of a first QoS flow and a QoS parameter corresponding to the first QoS flow to the network device, where data carried in the first QoS flow is sidelink data. Correspondingly, the network device receives the identifier of the first QoS flow and the QoS parameter corresponding to the first QoS flow from the communications apparatus.

(32) The network device sends, to the communications apparatus based on the identifier of the first QoS flow and the QoS parameter corresponding to the first QoS flow, the configuration corresponding to the fourth sidelink logical channel or the SR configuration to which the fourth sidelink logical channel is mapped, where the configuration corresponding to the fourth sidelink logical channel or the SR configuration to which the fourth sidelink logical channel is mapped includes the third indication information, and the fourth sidelink logical channel is used to transmit the data carried in the first QoS flow. Correspondingly, the communications apparatus receives, from the network device, the configuration corresponding to the fourth sidelink logical channel or the SR configuration to which the fourth sidelink logical channel is mapped.

In a specific implementation of step (32), the network device may determine, based on the QoS parameter, whether to use the configuration corresponding to the fourth sidelink logical channel or the SR configuration to which the fourth sidelink logical channel is mapped to carry the third indication information. For example, the QoS parameter may include a latency requirement of the first QoS flow. When the latency requirement is relatively high (for example, a data transmission latency is required to be less than 2 milliseconds), the configuration corresponding to the fourth sidelink logical channel or the SR configuration to which the fourth sidelink logical channel is mapped may not include the third indication information; or when the latency requirement is relatively low (for example, a data transmission latency is required to be less than 100 milliseconds), the configuration corresponding to the fourth sidelink logical channel or the SR configuration to which the fourth sidelink logical channel is mapped may include the third indication information.

Optionally, the method further includes: The network device sends a mapping relationship between the identifier of the first QoS flow and an identifier of a fourth sidelink radio bearer, an identifier of the fourth sidelink logical channel, or an identifier of a fourth sidelink logical channel group to the terminal based on the QoS parameter corresponding to the first QoS flow. Correspondingly, the terminal receives the mapping relationship between the identifier of the first QoS flow and the identifier of the fourth sidelink radio bearer, the identifier of the fourth sidelink logical channel, or the identifier of the fourth sidelink logical channel group from the network device.

The fourth sidelink logical channel is used to transmit the data carried in the first QoS flow, the fourth sidelink radio bearer is a sidelink radio bearer to which the fourth sidelink logical channel belongs, and the fourth sidelink logical channel group is a sidelink logical channel group to which the fourth sidelink logical channel belongs. One QoS flow corresponds to one sidelink radio bearer, and one sidelink radio bearer corresponds to one sidelink logical channel.

If the identifier of the fourth sidelink radio bearer or the identifier of the fourth sidelink logical channel is received, the terminal may determine the fourth sidelink logical channel based on the identifier. If the identifier of the fourth sidelink logical channel group is received, the terminal allocates an identifier to the fourth sidelink logical channel, and considers that the fourth sidelink logical channel belongs to the fourth sidelink logical channel group.

Fourth Part

Optionally, that the uplink MAC PDU meets the fourth condition includes: The uplink MAC PDU includes a non-truncated sidelink BSR MAC CE, where the non-truncated sidelink BSR MAC CE includes a buffer status of the communications apparatus up to (and including) a last event that triggers a sidelink BSR before the uplink MAC PDU is assembled. In this case, in a specific implementation, step 902 may include: When the uplink MAC PDU is transmitted, the communications apparatus cancels all pending second-type SRs that are triggered before the uplink MAC PDU is assembled.

Further, that the uplink MAC PDU meets the fourth condition includes: The uplink MAC PDU includes only a non-truncated sidelink BSR MAC CE, where the non-truncated sidelink BSR MAC CE includes a buffer status of the communications apparatus up to (and including) a last event that triggers a sidelink BSR before the uplink MAC PDU is assembled. In this case, in a specific implementation, step 902 may include: When the uplink MAC PDU is transmitted, the communications apparatus cancels only all pending second-type SRs that are triggered before the uplink MAC PDU is assembled.

In the fourth part, if a buffer status of the communications apparatus is 600 bits before the last event that triggers the sidelink BSR, and a buffer status of the communications apparatus is 800 bits after the last event that triggers the sidelink BSR, the buffer status included in the non-truncated sidelink BSR MAC CE is 800 bits.

It may be understood that if the uplink MAC PDU includes the non-truncated sidelink BSR MAC CE, it indicates that the uplink MAC PDU includes buffer statuses of all sidelink logical channel groups, and the included buffer statuses are latest buffer statuses. In this case, the network device only needs to allocate an SL grant to the communications apparatus by using the sidelink BSR MAC CE in the uplink MAC PDU, and the communications apparatus does not need to send an SR to request a resource for transmitting the sidelink BSR. Therefore, the communications apparatus may cancel the pending second-type SR, to avoid a problem in Example 4 that the SR is sent for a plurality of times, and save transmission resources.

Based on the foregoing solution in the fourth part, this application further includes the method in Solution 1 or Solution 2.

Solution 1

Further, optionally, the second-type SR includes a fourth sub-type SR of the second type, the second-type SR is the fourth sub-type SR of the second type, the fourth sub-type SR of the second type is an SR triggered by a fifth sidelink BSR, a fifth sidelink logical channel that triggers the fifth sidelink BSR meets a tenth condition, the fifth sidelink BSR belongs to the first sidelink BSR, and the tenth condition is: the fifth sidelink logical channel and any uplink logical channel are mapped to different SR configurations and/or different SR resources; or a configuration corresponding to the fifth sidelink logical channel or an SR configuration to which the fifth sidelink logical channel is mapped includes fourth indication information, where the fourth indication information indicates to cancel, when the uplink MAC PDU meets the fourth condition, the SR triggered by the fifth sidelink BSR. The fifth sidelink BSR is triggered by the fifth sidelink logical channel.

That the fifth sidelink BSR is triggered by the fifth sidelink logical channel includes: triggering the sidelink BSR when data arrives on the fifth sidelink logical channel; or triggering the fifth sidelink BSR when a BSR retransmission timer expires, where the fifth sidelink logical channel is a sidelink logical channel with a highest priority in sidelink logical channels having data available for transmission when the fifth sidelink BSR is triggered.

According to the optional method, the communications apparatus may cancel only the fourth sub-type SR of the second type. Another sub-type SR of the second type may be canceled based on another condition.

In a first case, if the fifth sidelink logical channel and the any uplink logical channel are mapped to the different SR configurations and/or the different SR resources, the network device may determine, based on the SR resource for sending the SR, that the received SR is an SL SR, and the network device may directly allocate an SL grant to the terminal. In this case, if the uplink MAC PDU meets the fourth condition, the network device may allocate an SL grant to the communications apparatus based on the sidelink BSR included in the uplink MAC PDU, and does not need to allocate an SL grant to the terminal based on the fourth sub-type SR of the second type. In other words, the communications apparatus needs to cancel the fourth sub-type SR of the second type, to avoid a resource waste caused because the network device allocates the SL grant to the communications apparatus based on the sidelink BSR included in the uplink MAC PDU and allocates the SL grant to the terminal based on the fourth sub-type SR of the second type.

In a second case, the communications apparatus may cancel the fourth sub-type SR of the second type according to an indication of the fourth indication information. The fourth indication information may be specifically implemented in two manners. In a first implementation, optionally, the configuration corresponding to the fifth sidelink logical channel or the SR configuration to which the fifth sidelink logical channel is mapped includes one parameter or one field. When the parameter or the field exists, it indicates that the SR triggered by the fifth sidelink BSR is canceled when the uplink MAC PDU meets the fourth condition; or when the parameter or the field does not exist, it indicates that the SR triggered by the fifth sidelink BSR is not canceled when the uplink MAC PDU meets the fourth condition, or vice versa. In a second implementation, the configuration corresponding to the fifth sidelink logical channel or the SR configuration to which the fifth sidelink logical channel is mapped includes one parameter or one field. A different value of the parameter or the field indicates different information. For example, when a value of the parameter or the field is true or 1, the parameter or the field indicates to cancel, when the uplink MAC PDU meets the fourth condition, the SR triggered by the fifth sidelink BSR. When a value of the parameter or the field is false or 0, the parameter or the field indicates not to cancel, when the uplink MAC PDU meets the fourth condition, the SR triggered by the fifth sidelink BSR.

In the second case, optionally, the method further includes the following steps.

(41) The communications apparatus sends an identifier of a first QoS flow and a QoS parameter corresponding to the first QoS flow to the network device, where data carried in the first QoS flow is sidelink data. Correspondingly, the network device receives the identifier of the first QoS flow and the QoS parameter corresponding to the first QoS flow from the communications apparatus.

(42) The network device sends, to the communications apparatus based on the identifier of the first QoS flow and the QoS parameter corresponding to the first QoS flow, the configuration corresponding to the fifth sidelink logical channel or the SR configuration to which the fifth sidelink logical channel is mapped, where the configuration corresponding to the fifth sidelink logical channel or the SR configuration to which the fifth sidelink logical channel is mapped includes the fourth indication information, and the fifth sidelink logical channel is used to transmit the data carried in the first QoS flow. Correspondingly, the communications apparatus receives, from the network device, the configuration corresponding to the fifth sidelink logical channel or the SR configuration to which the fifth sidelink logical channel is mapped.

In a specific implementation of step (42), the network device may determine, based on the QoS parameter, whether to use the configuration corresponding to the fifth sidelink logical channel or the SR configuration to which the fifth sidelink logical channel is mapped to carry the fourth indication information. For example, the QoS parameter may include a latency requirement of the first QoS flow. When the latency requirement is relatively high (for example, a data transmission latency is required to be less than 2 milliseconds), the configuration corresponding to the fifth sidelink logical channel or the SR configuration to which the fifth sidelink logical channel is mapped may not include the fourth indication information; or when the latency requirement is relatively low (for example, a data transmission latency is required to be less than 100 milliseconds), the configuration corresponding to the fifth sidelink logical channel or the SR configuration to which the fifth sidelink logical channel is mapped may include the fourth indication information, or vice versa.

Optionally, the method further includes: The network device sends a mapping relationship between the identifier of the first QoS flow and an identifier of a fifth sidelink radio bearer, an identifier of the fifth sidelink logical channel, or an identifier of a fifth sidelink logical channel group to the terminal based on the QoS parameter corresponding to the first QoS flow. Correspondingly, the terminal receives the mapping relationship between the identifier of the first QoS flow and the identifier of the fifth sidelink radio bearer, the identifier of the fifth sidelink logical channel, or the identifier of the fifth sidelink logical channel group from the network device.

The fifth sidelink logical channel is used to transmit the data carried in the first QoS flow, the fifth sidelink radio bearer is a sidelink radio bearer to which the fifth sidelink logical channel belongs, and the fifth sidelink logical channel group is a sidelink logical channel group to which the fifth sidelink logical channel belongs. One QoS flow corresponds to one sidelink radio bearer, and one sidelink radio bearer corresponds to one sidelink logical channel.

If the identifier of the fifth sidelink radio bearer or the identifier of the fifth sidelink logical channel is received, the terminal may determine the fifth sidelink logical channel based on the identifier. If the identifier of the fifth sidelink logical channel group is received, the terminal may allocate an identifier to the fifth sidelink logical channel, and consider that the fifth sidelink logical channel belongs to the fifth sidelink logical channel group.

Solution 2

In Example 3 and Example 4, even if the MAC PDU transmitted by using the UL grant includes the sidelink BSR, if the UL grant is used for transmission of an uplink service with a low latency requirement (for example, a latency requirement of 50 ms), but the SL SR is triggered by a V2X service with a high latency requirement (for example, a latency requirement of 3 ms), the latency requirement of the V2X service cannot be met even if the sidelink BSR is sent by using the UL grant.

To resolve this problem, further, optionally, the second-type SR includes a fifth sub-type SR of the second type, the second-type SR is the fifth sub-type SR of the second type, and the fifth sub-type SR of the second type is an SR triggered by a sixth sidelink BSR. A sixth sidelink channel that triggers the sixth sidelink BSR and an uplink resource used to transmit the uplink MAC PDU that meets the fourth condition meet a first relationship, and the sixth sidelink BSR belongs to the first sidelink BSR. A configuration corresponding to the sixth sidelink logical channel or an SR configuration to which the sixth sidelink logical channel is mapped includes at least one of the following two parameters: a first parameter, namely, a subcarrier spacing list, and a second parameter, namely, a maximum value of PUSCH duration (namely, a time length of a time domain resource occupied by a PUSCH).

If the configuration corresponding to the sixth sidelink logical channel or the SR configuration to which the sixth sidelink logical channel is mapped includes only the first parameter, the first relationship is that a subcarrier spacing of the uplink resource used to transmit the uplink MAC PDU that meets the fourth condition is included in a value set of the first parameter.

If the configuration corresponding to the sixth sidelink logical channel or the SR configuration to which the sixth sidelink logical channel is mapped includes only the second parameter, the first relationship is that PUSCH duration of the uplink resource used to transmit the uplink MAC PDU that meets the fourth condition is less than a value of the second parameter.

If the configuration corresponding to the sixth sidelink logical channel or the SR configuration to which the sixth sidelink logical channel is mapped includes the first parameter and the second parameter, the first relationship is that a subcarrier spacing of the uplink resource used to transmit the uplink MAC PDU that meets the fourth condition is included in a value set of the first parameter and PUSCH duration of the uplink resource used to transmit the uplink MAC PDU that meets the fourth condition is less than a value of the second parameter.

According to the method in Solution 2, the communications apparatus may cancel only the fifth sub-type SR of the second type. For the SR triggered by the sixth sidelink BSR, when the sixth sidelink logical channel that triggers the sixth sidelink BSR and the uplink resource used to transmit the uplink MAC PDU that meets the fourth condition do not meet the first relationship, the communications apparatus does not cancel the fifth sub-type SR of the second type.

According to the method in Solution 2, an SR triggered by the V2X service with the high latency requirement can be prevented from being canceled prematurely, and a transmission latency of the service can be reduced.

For the descriptions of the first part to the fourth part, when the SL grant meets the third condition and/or the uplink MAC PDU meets the fourth condition, the communications apparatus may not cancel the first sub-type SR of the second type and the second sub-type SR of the second type. Alternatively, when the UL grant meets the first condition and/or the uplink MAC PDU meets the second condition, the communications apparatus may not cancel the third sub-type SR of the second type and the fourth sub-type SR of the second type.

Fifth Part

Optionally, that the first sidelink logical channel meets the fifth condition includes: An autonomous resource selection manner is configured for use on the first sidelink logical channel. When the autonomous resource selection manner is configured for use on the first sidelink logical channel, the communications apparatus does not need to request a transmission resource corresponding to the first sidelink logical channel from the network device. Therefore, the communications apparatus may cancel the second-type SR, to avoid unnecessary transmission of the second-type SR and save transmission resources. In this case, the second-type SR is triggered by the first sidelink BSR, and the first sidelink BSR is triggered by the first sidelink logical channel.

Based on the fifth condition, the communications apparatus may cancel only the second-type SR, and the terminal does not cancel a pending first-type SR even if there is the pending first-type SR.

It may be understood that when the communications apparatus has a plurality of pending SRs, if the fifth condition is met, the communications apparatus cancels only the pending SR triggered by the sidelink BSR triggered by the first sidelink logical channel. The sidelink BSR is triggered by the first sidelink logical channel. Further, that the sidelink BSR is triggered by the first sidelink logical channel includes: triggering the sidelink BSR when data arrives on the first sidelink logical channel; or triggering the sidelink BSR when a BSR retransmission timer expires, where the first sidelink logical channel is a sidelink logical channel with a highest priority in sidelink logical channels having data available for transmission when the sidelink BSR is triggered.

Sixth Part

Optionally, that the communications apparatus meets the sixth condition includes: The communications apparatus is configured to use an autonomous resource selection manner.

When the communications apparatus is configured to use the autonomous resource selection manner, the communications apparatus does not need to request a sidelink transmission resource from the network device. Therefore, the communications apparatus may cancel the second-type SR, to avoid unnecessary transmission of the second-type SR and save transmission resources.

Based on the sixth condition, the communications apparatus may cancel only the second-type SR in the SRs. It may be understood that when there are both the pending first-type SR and the pending second-type SR, if the sixth condition is met, the communications apparatus cancels the second-type SR in the SRs.

It should be noted that in the foregoing embodiments, cancellation of each type of SR is independent of cancellation of another type of SR. For example, when the UL grant meets the first condition, the communications apparatus cancels the first-type SR in the SRs. In this case, if the SL grant meets the third condition, the communications apparatus may further cancel the second-type SR.

For the foregoing solutions based on the first condition to the sixth condition, Case 1 and Case 2 may also be integrated. For other descriptions of an integrated solution and a further solution, refer to the foregoing descriptions.

Case 1: SRs include a first-type SR and a second-type SR, and the first-type SR and the second-type SR may respectively correspond to respective cancellation methods.

The first-type SR is an SR triggered by an uplink BSR. The second-type SR is an SR triggered by a first sidelink BSR.

A cancellation method corresponding to the first-type SR is Method 1 or Method 2.

Method 1

Method 1 includes:
the communications apparatus triggers SRs; and
when a UL grant is sufficient to accommodate all available pending uplink data, the communications apparatus cancels all pending first-type SRs in the SRs, where the first-type SR is an SR triggered by an uplink BSR; and/or
when an uplink MAC PDU is transmitted, the communications apparatus cancels all pending first-type SRs that are in the SRs and that are triggered before the uplink MAC PDU is assembled, where the first-type SR is an SR triggered by an uplink BSR, the uplink MAC PDU includes a non-truncated uplink BSR MAC CE, and the non-truncated uplink BSR MAC CE includes a buffer status of the communications apparatus up to (and including) a last event that triggers the uplink BSR before the uplink MAC PDU is assembled.

Method 2

Method 2 includes any one or more of the following methods:

Method (1): The communications apparatus triggers SRs; and when an SL grant is sufficient to accommodate all available pending sidelink data, the communications apparatus cancels all pending second-type SRs in the SRs, where the second-type SR is an SR triggered by a sidelink BSR.

Method (2): The communications apparatus triggers SRs; and when an uplink MAC PDU is transmitted, the communications apparatus cancels all pending second-type SRs that are in the SRs and that are triggered before the uplink MAC PDU is assembled, where the second-type SR is an SR triggered by a sidelink BSR, the uplink MAC PDU includes a non-truncated sidelink BSR MAC CE, and the non-truncated sidelink BSR MAC CE includes a buffer status of the communications apparatus up to (and including) a last event that triggers the sidelink BSR before the uplink MAC PDU is assembled.

Method (3): The communications apparatus triggers SRs; and when an autonomous resource selection manner is configured for use on a first sidelink logical channel, the communications apparatus cancels all pending second-type SRs in the SRs, where the second-type SR is an SR triggered by a sidelink BSR, and the sidelink BSR is triggered by the first sidelink logical channel.

Method (4): The communications apparatus triggers SRs; and when the communications apparatus is configured to use an autonomous resource selection manner, the communications apparatus cancels all pending second-type SRs in the SRs, where the second-type SR is an SR triggered by a sidelink BSR.

Case 2: There are five types of SRs. Some SRs may be all canceled, and some SRs may be canceled separately.

The five types of SRs are as follows:

Type-1 SR: The type-1 SR is an SR triggered by an uplink BSR.

Type-2 SR: The type-2 SR is an SR triggered by a sidelink BSR, and a sidelink logical channel that triggers the sidelink BSR meets the following condition: at least one of an SR configuration to which the sidelink logical channel is mapped and an SR resource to which the sidelink logical channel is mapped is also mapped to at least one uplink logical channel; or a configuration corresponding to the sidelink logical channel or an SR configuration to which the sidelink logical channel is mapped includes first indication information, where the first indication information indicates to cancel, when the UL grant meets the first condition, the SR triggered by the sidelink BSR; and that the UL grant meets the first condition includes: The UL grant is sufficient to accommodate all available pending uplink data.

Type-3 SR: The type-3 SR is an SR triggered by a sidelink BSR, and a sidelink logical channel that triggers the sidelink BSR meets the following condition: at least one of an SR configuration to which the sidelink logical channel is mapped and an SR resource to which the sidelink logical channel is mapped is also mapped to at least one uplink logical channel; or a configuration corresponding to the sidelink logical channel or an SR configuration to which the sidelink logical channel is mapped includes second indication information, where the second indication information indicates to cancel, when the uplink MAC PDU meets the second condition, the SR triggered by the sidelink BSR; and that the uplink MAC PDU meets the second condition includes: The uplink MAC PDU includes a non-truncated uplink BSR MAC CE, where the non-truncated uplink BSR MAC CE includes a buffer status of the communications apparatus up to (and including) a last event that triggers an uplink BSR before the uplink MAC PDU is assembled.

Type-4 SR: The type-4 SR is an SR triggered by a sidelink BSR, and a sidelink logical channel that triggers the sidelink BSR meets the following condition: the sidelink logical channel and any uplink logical channel are mapped to different SR configurations and/or different SR resources; or a configuration corresponding to the sidelink logical channel or an SR configuration to which the sidelink logical channel is mapped includes third indication information, where the third indication information indicates to cancel, when the SL grant meets the third condition, the SR triggered by the sidelink BSR; and that the SL grant meets the third condition includes: The SL grant is sufficient to accommodate all available pending sidelink data.

Type-5 SR: The type-5 SR is an SR triggered by a sidelink BSR, and a sidelink logical channel that triggers the sidelink BSR meets the following condition: the sidelink logical channel and any uplink logical channel are mapped to different SR configurations and/or different SR resources; or a configuration corresponding to the sidelink logical channel or an SR configuration to which the sidelink logical channel is mapped includes fourth indication information, where the fourth indication information indicates to cancel, when the uplink MAC PDU meets the fourth condition, the SR triggered by the sidelink BSR; and that the uplink MAC PDU meets the fourth condition includes: The uplink MAC PDU includes a non-truncated sidelink BSR MAC CE, where the non-truncated sidelink BSR MAC CE includes a buffer status of the communications apparatus up to (and including) a last event that triggers the sidelink BSR before the uplink MAC PDU is assembled.

In Case 2, in a first possible implementation, both the type-1 SR and the type-2 SR may be canceled. This implementation specifically includes:

the communications apparatus triggers SRs; and
when the UL grant meets the first condition, the communications apparatus cancels all pending type-1 SRs and all pending type-2 SRs in the SRs.

In Case 2, in a second possible implementation, both the type-1 SR and the type-3 SR may be canceled. This implementation specifically includes:

the communications apparatus triggers SRs; and
when the uplink MAC PDU meets the second condition, and the uplink MAC PDU is transmitted, the communications apparatus cancels all pending type-1 SRs and all pending type-3 SRs that are in the SRs and that are triggered before the uplink MAC PDU is assembled.

In Case 2, in a third possible implementation, the type-4 SR may be canceled separately. This implementation specifically includes:

the communications apparatus triggers SRs; and
when the SL grant meets the third condition, the communications apparatus cancels all pending type-4 SRs in the SRs.

In Case 2, in a fourth possible implementation, the type-5 SR may be canceled separately. This implementation specifically includes:

the communications apparatus triggers SRs; and
when the uplink MAC PDU meets the fourth condition, and the uplink MAC PDU is transmitted, the communications apparatus cancels all pending type-5 SRs that are in the SRs and that are triggered before the uplink MAC PDU is assembled.

It should be noted that in Case 1 and Case 2, cancellation of each type of SR is independent of cancellation of another type of SR. For example, when the uplink MAC PDU meets the fourth condition, and the uplink MAC PDU is transmitted, the communications apparatus cancels all the pending type-5 SRs that are in the SRs and that are triggered before the uplink MAC PDU is assembled. In this case, if the UL grant meets the first condition, the communications apparatus may further cancel the type-1 SR and the type-2 SR.

Embodiment 2

Figure 10:
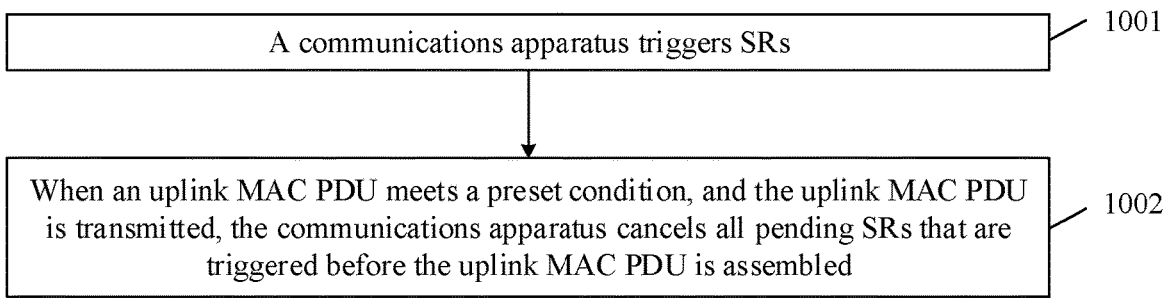

Embodiment 2 provides a pending SR cancellation method. As shown in FIG. 10, the method includes the following steps.

1001: A communications apparatus triggers SRs.

Optionally, the communications apparatus may be a terminal, or may be a chip that can be configured to perform the method provided in Embodiment 2.

1002: When an uplink MAC PDU meets a preset condition, and the uplink MAC PDU is transmitted, the communications apparatus cancels all pending SRs that are triggered before the uplink MAC PDU is assembled.

According to the method provided in Embodiment 2, the communications apparatus may uniformly cancel the pending SRs. Compared with Embodiment 1, this embodiment can reduce implementation complexity of the communications apparatus.

That the uplink MAC PDU meets the preset condition may include the following several cases.

Case 1

That the uplink MAC PDU meets the preset condition includes: The uplink MAC PDU includes a non-truncated sidelink BSR MAC CE, where the non-truncated sidelink BSR MAC CE includes a buffer status of the communications apparatus up to (and including) a last event that triggers a sidelink BSR before the uplink MAC PDU is assembled.

In Case 1, in the prior art, during logical channel priority processing, it is considered, by default, that a priority of an uplink BSR MAC CE is higher than a priority of a sidelink BSR MAC CE. To be specific, when assembling the uplink MAC PDU, the communications apparatus preferentially assembles the uplink BSR MAC CE. Therefore, if the uplink MAC PDU includes the non-truncated sidelink BSR MAC CE, the uplink MAC PDU definitely includes a non-truncated uplink BSR MAC CE. In this case, the communications apparatus does not need to request, from a network device by using the SR, a UL grant for transmitting the sidelink BSR and an uplink BSR, and therefore the communications apparatus cancels the pending SR.

Optionally, during logical channel priority processing, the priority of the uplink BSR MAC CE is higher than the priority of the sidelink BSR MAC CE.

Case 2

That the uplink MAC PDU meets the preset condition includes: During logical channel priority processing, a priority of a sidelink BSR MAC CE is higher than a priority of an uplink BSR MAC CE (to be specific, when assembling the uplink MAC PDU, the communications apparatus preferentially assembles the sidelink BSR MAC CE), and the uplink MAC PDU includes a non-truncated uplink BSR MAC CE, where the non-truncated uplink BSR MAC CE includes a buffer status of the communications apparatus up to (and including) a last event that triggers an uplink BSR before the uplink MAC PDU is assembled.

In Case 2, during logical channel priority processing, the priority of the sidelink BSR MAC CE is higher than the priority of the uplink BSR MAC CE. To be specific, when assembling the uplink MAC PDU, the communications apparatus preferentially assembles the sidelink BSR MAC CE. Therefore, if the uplink MAC PDU includes the non-truncated uplink BSR MAC CE, the uplink MAC PDU definitely includes a non-truncated sidelink BSR MAC CE. In this case, the communications apparatus does not need to request, from a network device by using the SR, a UL grant for transmitting a sidelink BSR and the uplink BSR, and therefore the communications apparatus cancels the pending SR.

Case 3

That the uplink MAC PDU meets the preset condition includes: The uplink MAC PDU includes a non-truncated uplink BSR MAC CE and a non-truncated sidelink BSR MAC CE, where the non-truncated uplink BSR MAC CE includes a buffer status of the communications apparatus up to (and including) a last event that triggers an uplink BSR before the uplink MAC PDU is assembled, and the non-truncated sidelink BSR MAC CE includes a buffer status of the communications apparatus up to (and including) a last event that triggers a sidelink BSR before the uplink MAC PDU is assembled.

In Case 3, the uplink MAC PDU includes the non-truncated uplink BSR MAC CE and the non-truncated sidelink BSR MAC CE. In this case, the communications apparatus does not need to request, from a network device by using the SR, a UL grant for transmitting the sidelink BSR and the uplink BSR, and therefore the communications apparatus cancels the pending SR.

Case 4

That the uplink MAC PDU meets the preset condition includes: The uplink MAC PDU includes all available pending uplink data.

In Case 4, a priority of a sidelink BSR MAC CE is higher than a priority of uplink data. Therefore, if the uplink MAC PDU includes all the available pending uplink data, the uplink MAC PDU may definitely carry the sidelink BSR MAC CE. In this case, the communications apparatus does not need to request, from a network device by using the SR, a UL grant for transmitting a sidelink BSR and an uplink BSR, and therefore the communications apparatus cancels the pending SR.

In Example 3 and Example 4, even if the MAC PDU transmitted by using the UL grant includes the sidelink BSR, if the UL grant is used for transmission of an uplink service with a low latency requirement (for example, a latency requirement of 50 ms), but the SL SR is triggered by a V2X service with a high latency requirement (for example, a latency requirement of 3 ms), the latency requirement of the V2X service cannot be met even if the sidelink BSR is sent by using the UL grant.

To resolve the problem, based on Case 1 to Case 4, the method further includes the following optional solutions.

Further, optionally, for an SR that is in the SRs and that is triggered by a seventh sidelink BSR, only an SR that meets a condition 1 is canceled. The condition 1 is that a seventh sidelink logical channel that triggers the seventh sidelink BSR and an uplink resource used to transmit the uplink MAC PDU that meets the preset condition meet a first relationship.

A configuration corresponding to the seventh sidelink logical channel or an SR configuration to which the seventh sidelink logical channel is mapped includes at least one of the following two parameters: a first parameter, namely, a subcarrier spacing list, and a second parameter, namely, a maximum value of PUSCH duration.

If the configuration corresponding to the seventh sidelink logical channel or the SR configuration to which the seventh sidelink logical channel is mapped includes only the first parameter, the first relationship is that a subcarrier spacing of the uplink resource used to transmit the uplink MAC PDU that meets the preset condition is included in a value set of the first parameter.

If the configuration corresponding to the seventh sidelink logical channel or the SR configuration to which the seventh sidelink logical channel is mapped includes only the second parameter, the first relationship is that PUSCH duration of the uplink resource used to transmit the uplink MAC PDU that meets the preset condition is less than a value of the second parameter.

If the configuration corresponding to the seventh sidelink logical channel or the SR configuration to which the seventh sidelink logical channel is mapped includes the first parameter and the second parameter, the first relationship is that a subcarrier spacing of the uplink resource used to transmit the uplink MAC PDU that meets the preset condition is included in a value set of the first parameter and PUSCH duration of the uplink resource used to transmit the uplink MAC PDU that meets the preset condition is less than a value of the second parameter.

According to the optional method, for the SR triggered by the seventh sidelink BSR, when the seventh sidelink logical channel and the uplink resource used to transmit the uplink MAC PDU that meets the preset condition do not meet the first relationship, the communications apparatus does not cancel the SR triggered by the seventh sidelink BSR.

According to the optional method, an SR triggered by the V2X service with the high latency requirement can be prevented from being canceled prematurely, and a transmission latency of the service can be reduced.

Embodiment 3

Figure 11:
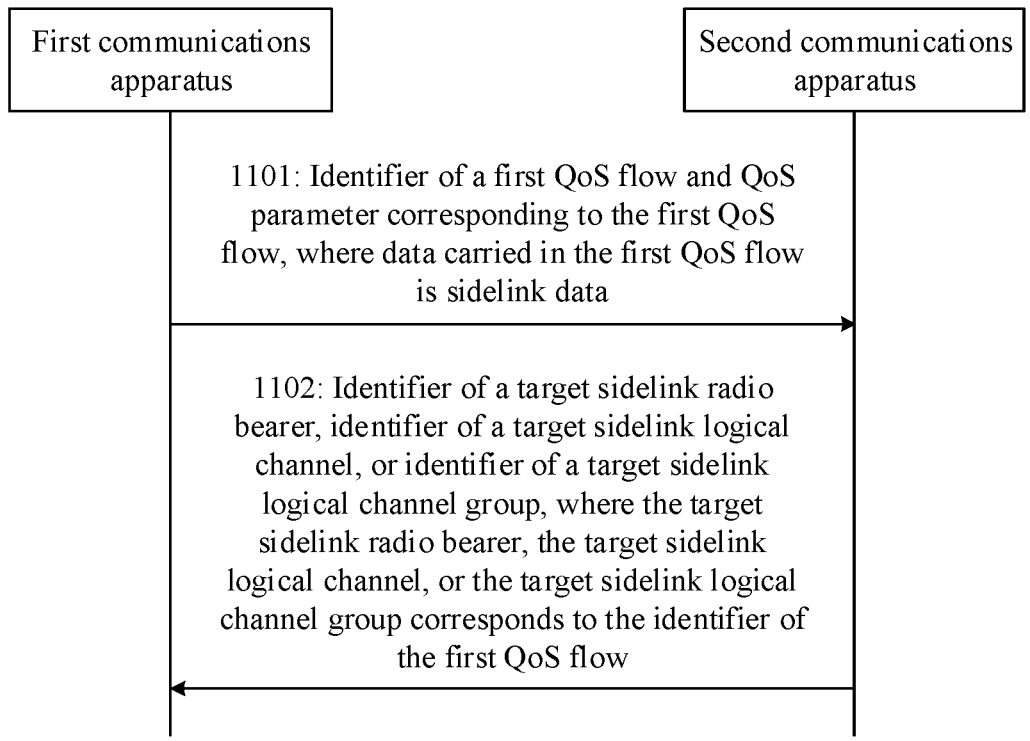
FIG. 11 is a flowchart of a communication method according to an embodiment of this application.

Embodiment 3 provides a communication method. As shown in FIG. 11, the method includes the following steps.

1101: A first communications apparatus sends an identifier of a first QoS flow and a QoS parameter corresponding to the first QoS flow to a second communications apparatus, where data carried in the first QoS flow is sidelink data. Correspondingly, the second communications apparatus receives the identifier of the first QoS flow and the QoS parameter corresponding to the first QoS flow from the first communications apparatus.

The QoS parameter includes but is not limited to a guaranteed transmission rate, a maximum transmission rate, a latency requirement, a reliability requirement, a priority, and a communication distance. Further, the QoS parameter may also be understood as an index value corresponding to a specific QoS parameter.

The first communications apparatus may be a terminal, and the second communications apparatus may be a network device. For descriptions of the terminal and the network device, refer to the foregoing descriptions. Details are not described herein again.

1102: The second communications apparatus sends a mapping relationship between the identifier of the first QoS flow and an identifier of a target sidelink radio bearer, an identifier of a target sidelink logical channel, or an identifier of a target sidelink logical channel group to the first communications apparatus based on the QoS parameter corresponding to the first QoS flow. Correspondingly, the first communications apparatus receives the mapping relationship between the identifier of the first QoS flow and the identifier of the target sidelink radio bearer, the identifier of the target sidelink logical channel, or the identifier of the target sidelink logical channel group from the second communications apparatus.

The target sidelink logical channel is used to transmit the data carried in the first QoS flow, the target sidelink radio bearer is a sidelink radio bearer to which the target sidelink logical channel belongs, and the target sidelink logical channel group is a sidelink logical channel group to which the target sidelink logical channel belongs. One QoS flow corresponds to one sidelink radio bearer, and one sidelink radio bearer corresponds to one sidelink logical channel.

After step 1102, if the identifier of the target sidelink radio bearer or the identifier of the target sidelink logical channel is received, the first communications apparatus device may determine the target sidelink logical channel based on the identifier. If the identifier of the target sidelink logical channel group is received, the first communications apparatus may allocate an identifier to the target sidelink logical channel, and consider that the target sidelink logical channel belongs to the target sidelink logical channel group.

In the prior art, when requesting a sidelink logical channel from the second communications apparatus for a QoS flow for carrying sidelink data, the first communications apparatus needs to send a QoS parameter corresponding to the QoS flow to the second communications apparatus. To enable the first communications apparatus to determine a specific QoS flow to which an allocated sidelink logical channel corresponds, the second communications apparatus notifies the first communications apparatus of a correspondence between an identifier of the sidelink logical channel and the QoS parameter. Because the QoS parameter includes a relatively large amount of information, a large quantity of transmission resources need to be consumed. According to the method provided in Embodiment 3, the first communications apparatus may allocate an identifier corresponding to the QoS flow. When requesting the sidelink logical channel from the second communications apparatus for the QoS flow for carrying the sidelink data, the first communications apparatus may send the identifier of the QoS flow and the QoS parameter corresponding to the QoS flow to the second communications apparatus, and the second communications apparatus may send a correspondence between the identifier of the allocated sidelink logical channel and the identifier of the QoS flow to the first communications apparatus. Then, the first communications apparatus may determine, based on the correspondence, the sidelink logical channel for transmitting the data carried in the QoS flow, and the second communications apparatus does not need to send the correspondence between the identifier of the sidelink logical channel and the QoS parameter to the first communications apparatus. Therefore, transmission resources can be saved.

Optionally, the method further includes: The second communications apparatus sends, to the first communications apparatus, a configuration corresponding to the target sidelink logical channel or an SR configuration to which the target sidelink logical channel is mapped, where the configuration corresponding to the target sidelink logical channel or the SR configuration to which the target sidelink logical channel is mapped includes one or more of first indication information, second indication information, third indication information, and fourth indication information. Correspondingly, the first communications apparatus receives, from the second communications apparatus, the configuration corresponding to the target sidelink logical channel or the SR configuration to which the target sidelink logical channel is mapped.

For related descriptions of the first indication information, the second indication information, the third indication information, and the fourth indication information, refer to the related descriptions in Embodiment 1. Details are not described herein again.

Optionally, in a specific implementation of the method, the second communications apparatus may determine, based on the QoS parameter, whether to use the configuration corresponding to the target sidelink logical channel or the SR configuration to which the target sidelink logical channel is mapped to carry one or more of the first indication information, the second indication information, the third indication information, and the fourth indication information. For example, the QoS parameter may include a latency requirement of the first QoS flow. When the latency requirement is relatively high (for example, a data transmission latency is required to be less than 2 milliseconds), the configuration corresponding to the target sidelink logical channel or the SR configuration to which the target sidelink logical channel is mapped may not include any one of the first indication information, the second indication information, the third indication information, and the fourth indication information. When the latency requirement is relatively low (for example, a data transmission latency is required to be less than 100 milliseconds), the configuration corresponding to the target sidelink logical channel or the SR configuration to which the target sidelink logical channel is mapped may include one or more of the first indication information, the second indication information, the third indication information, and the fourth indication information.

The foregoing mainly describes the solutions in the embodiments of this application from a perspective of interaction between the network elements. It may be understood that, to implement the foregoing functions, the communications apparatuses (for example, the network device and the terminal) each include at least one of a corresponding hardware structure and software module for performing the functions. A person skilled in the art should be easily aware that units, algorithms, and steps in the examples described with reference to the embodiments disclosed in this specification can be implemented by hardware or a combination of hardware and computer software in this application. Whether the functions are performed by hardware or hardware driven by computer software depends on a particular application and a design constraint of the technical solutions. A person skilled in the art may use different methods to implement the described functions for each particular application, but it should not be considered that such an implementation goes beyond the scope of this application.

In the embodiments of this application, the communications apparatuses (for example, the network device and the terminal) each may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

Figure 12:
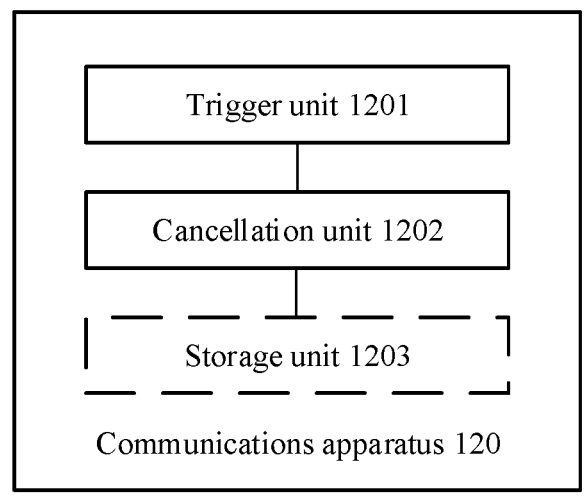
FIG. 12 and FIG. 13 each are a schematic composition diagram of a communications apparatus according to an embodiment of this application.

FIG. 12 is a possible schematic structural diagram of a communications apparatus (denoted as a communications apparatus 120) in the foregoing embodiments. The communications apparatus 120 includes a trigger unit 1201 and a cancellation unit 1202. Optionally, the communications apparatus 120 further includes a storage unit 1203. The storage unit 1203 is configured to store a computer program, and the trigger unit 1201 and the cancellation unit 1202 invoke the computer program to perform a corresponding action in the following descriptions.

The trigger unit 1201 is configured to trigger SRs.

The cancellation unit 1202 is configured to: when a UL grant meets a first condition or an uplink MAC PDU meets a second condition, cancel all pending first-type SRs in the SRs, where the first-type SR is an SR triggered by an uplink BSR; and/or when an SL grant meets a third condition, an uplink MAC PDU meets a fourth condition, a first sidelink logical channel meets a fifth condition, or the communications apparatus meets a sixth condition, cancel all pending second-type SRs in the SRs, where the second-type SR is an SR triggered by a first sidelink BSR; and when the first sidelink logical channel meets the fifth condition, the first sidelink logical channel is a logical channel that triggers the first sidelink BSR.

Optionally, the communications apparatus is a terminal.

Optionally, that the UL grant meets the first condition includes: The UL grant is sufficient to accommodate all available pending uplink data.

Optionally, the second-type SR includes a first sub-type SR of a second type, the first sub-type SR of the second type is an SR triggered by a second sidelink BSR, a second sidelink logical channel that triggers the second sidelink BSR meets a seventh condition, the second sidelink BSR belongs to the first sidelink BSR, and the seventh condition is: at least one of an SR configuration to which the second sidelink logical channel is mapped and an SR resource to which the second sidelink logical channel is mapped is also mapped to at least one uplink logical channel; or a configuration corresponding to the second sidelink logical channel or an SR configuration to which the second sidelink logical channel is mapped includes first indication information, where the first indication information indicates to cancel, when the UL grant meets the first condition, the SR triggered by the second sidelink BSR.

The cancellation unit 1202 is specifically configured to cancel all pending first sub-type SRs of the second type in the SRs.

Optionally, that the uplink MAC PDU meets the second condition includes: The uplink MAC PDU includes a non-truncated uplink BSR MAC CE, where the non-truncated uplink BSR MAC CE includes a buffer status of the communications apparatus up to (and including) a last event that triggers the uplink BSR before the uplink MAC PDU is assembled.

The cancellation unit 1202 is specifically configured to: when the uplink MAC PDU is transmitted, cancel all pending first-type SRs that are triggered before the uplink MAC PDU is assembled.

Optionally, the second-type SR includes a second sub-type SR of a second type, the second sub-type SR of the second type is an SR triggered by a third sidelink BSR, a third sidelink logical channel that triggers the third sidelink BSR meets an eighth condition, the third sidelink BSR belongs to the first sidelink BSR, and the eighth condition is: at least one of an SR configuration to which the third sidelink logical channel is mapped and an SR resource to which the third sidelink logical channel is mapped is also mapped to at least one uplink logical channel; or a configuration corresponding to the third sidelink logical channel or an SR configuration to which the third sidelink logical channel is mapped includes second indication information, where the second indication information indicates to cancel, when the uplink MAC PDU meets the second condition, the SR triggered by the third sidelink BSR.

The cancellation unit 1202 is specifically configured to: when the uplink MAC PDU is transmitted, cancel all pending second sub-type SRs of the second type that are triggered before the uplink MAC PDU is assembled.

Optionally, that the SL grant meets the third condition includes: The SL grant is sufficient to accommodate all available pending sidelink data.

Optionally, the second-type SR includes a third sub-type SR of a second type, the second-type SR is the third sub-type SR of the second type, the third sub-type SR of the second type is an SR triggered by a fourth sidelink BSR, a fourth sidelink logical channel that triggers the fourth sidelink BSR meets a ninth condition, the fourth sidelink BSR belongs to the first sidelink BSR, and the ninth condition is: the fourth sidelink logical channel and any uplink logical channel are mapped to different SR configurations and/or different SR resources; or a configuration corresponding to the fourth sidelink logical channel or an SR configuration to which the fourth sidelink logical channel is mapped includes third indication information, where the third indication information indicates to cancel, when the SL grant meets the third condition, the SR triggered by the fourth sidelink BSR.

Optionally, that the uplink MAC PDU meets the fourth condition includes: The uplink MAC PDU includes a non-truncated sidelink BSR MAC CE, where the non-truncated sidelink BSR MAC CE includes a buffer status of the communications apparatus up to (and including) a last event that triggers a sidelink BSR before the uplink MAC PDU is assembled.

The cancellation unit 1202 is specifically configured to: when the uplink MAC PDU is transmitted, cancel all pending second-type SRs that are triggered before the uplink MAC PDU is assembled.

Optionally, the second-type SR includes a fourth sub-type SR of a second type, the second-type SR is the fourth sub-type SR of the second type, the fourth sub-type SR of the second type is an SR triggered by a fifth sidelink BSR, a fifth sidelink logical channel that triggers the fifth sidelink BSR meets a tenth condition, the fifth sidelink BSR belongs to the first sidelink BSR, and the tenth condition is: the fifth sidelink logical channel and any uplink logical channel are mapped to different SR configurations and/or different SR resources; or a configuration corresponding to the fifth sidelink logical channel or an SR configuration to which the fifth sidelink logical channel is mapped includes fourth indication information, where the fourth indication information indicates to cancel, when the uplink MAC PDU meets the fourth condition, the SR triggered by the fifth sidelink BSR.

Optionally, that the first sidelink logical channel meets the fifth condition includes: An autonomous resource selection manner is configured for use on the first sidelink logical channel.

Optionally, that the communications apparatus meets the sixth condition includes: The communications apparatus is configured to use an autonomous resource selection manner.

Figure 13:
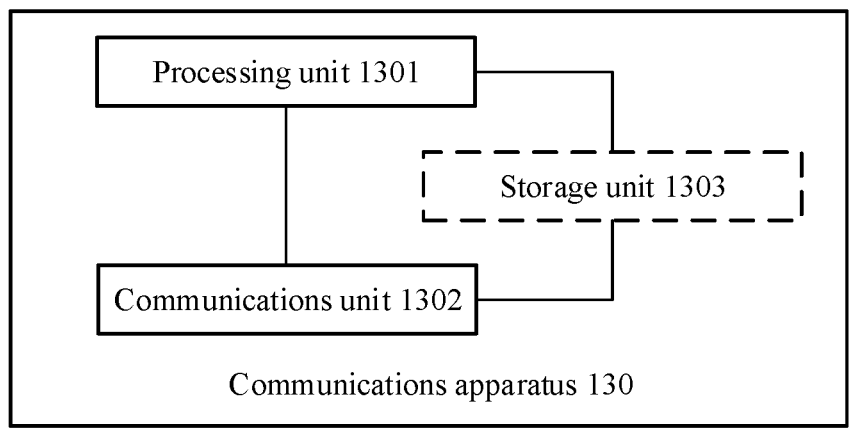

FIG. 13 is a possible schematic structural diagram of a communications apparatus (denoted as a communications apparatus 130) in the foregoing embodiments. The communications apparatus 130 includes a processing unit 1301 and a communications unit 1302, and may further include a storage unit 1303. The storage unit 1303 is configured to store a computer program, and the processing unit 1301 and the communications unit 1302 invoke the computer program to perform a corresponding action in the following descriptions. The schematic structural diagram shown in FIG. 13 may be used to show structures of the first communications apparatus and the second communications apparatus in the foregoing embodiments.

When the schematic structural diagram shown in FIG. 13 is used to show the structure of the first communications apparatus (for example, the terminal) in the foregoing embodiments, the processing unit 1301 is configured to: control and manage an action of the first communications apparatus. For example, the processing unit 1301 is configured to perform steps 1101 and 1102 in FIG. 11 by using the communications unit 1302, and/or an action performed by the first communications apparatus in another process described in the embodiments of this application. The processing unit 1301 may communicate with another network entity through the communications unit 1302, for example, communicate with the second communications apparatus shown in FIG. 11. The storage unit 1303 is configured to store program code and data that are of the first communications apparatus.

When the schematic structural diagram shown in FIG. 13 is used to show the structure of the second communications apparatus (for example, the network device) in the foregoing embodiments, the processing unit 1301 is configured to: control and manage an action of the second communications apparatus. For example, the processing unit 1301 is configured to perform steps 1101 and 1102 in FIG. 11 by using the communications unit 1302, and/or an action performed by the second communications apparatus in another process described in the embodiments of this application. The processing unit 1301 may communicate with another network entity through the communications unit 1302, for example, communicate with the first communications apparatus shown in FIG. 11. The storage unit 1303 is configured to store program code and data that are of the second communications apparatus.

When the communications apparatus 130 is the terminal or the network device, the processing unit 1301 may be a processor or a controller, and the communications unit 1302 may be a communications interface, a transceiver, a transceiver, a transceiver circuit, a transceiver apparatus, or the like. The communications interface is a collective term, and may include one or more interfaces. The storage unit 1303 may be a memory. When the communications apparatus 130 is a chip in the terminal or the network device, the processing unit 1301 may be a processor or a controller, and the communications unit 1302 may be an input/output interface, a pin, a circuit, or the like. The storage unit 1303 may be a storage unit (for example, a register or a cache) in the chip, or may be a storage unit (for example, a read-only memory or a random access memory) that is in the terminal or the network device and that is located outside the chip.

The communications unit may also be referred to as a transceiver unit. An antenna and a control circuit that have receiving and sending functions in the communications apparatus 130 may be considered as the communications unit 1302 in the communications apparatus 130, and a processor that has a processing function in the communications apparatus 130 may be considered as the processing unit 1301 in the communications apparatus 130. Optionally, a component configured to implement a receiving function in the communications unit 1302 may be considered as a receiving unit. The receiving unit is configured to perform a receiving step in the embodiments of this application. The receiving unit may be a receiver, a receiver, a receiver circuit, or the like. A component configured to implement a sending function in the communications unit 1302 may be considered as a sending unit. The sending unit is configured to perform a sending step in the embodiments of this application. The sending unit may be a transmitter, a transmitter, a sending circuit, or the like.

When an integrated unit in FIG. 13 is implemented in a form of a software function module and sold or used as an independent product, the integrated unit may be stored in a computer readable storage medium. Based on such an understanding, the technical solutions in the embodiments of this application essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) or a processor (processor) to perform all or some of the steps of the methods in the embodiments of this application. The storage medium that stores the computer software product includes any medium that can store program code, such as a USB flash drive, a removable hard disk, a read-only memory (read-only memory, ROM), a random access memory (random access memory, RAM), a magnetic disk, or an optical disc.

The unit in FIG. 13 may alternatively be referred to as a module. For example, the processing unit may be referred to as a processing module.

Figure 14:
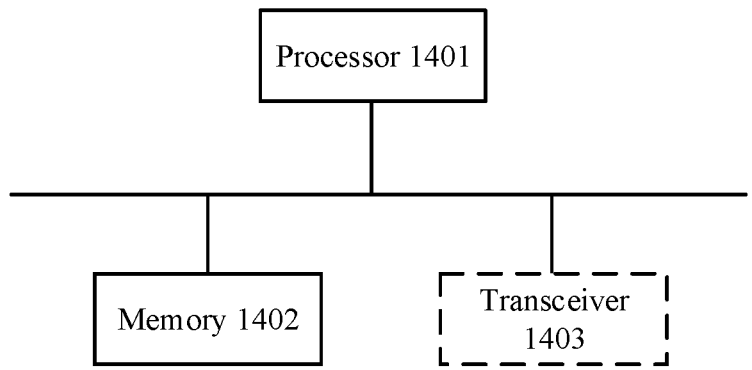
FIG. 14 and FIG. 15 each are a schematic structural diagram of hardware of a communications apparatus according to an embodiment of this application.
Figure 15:
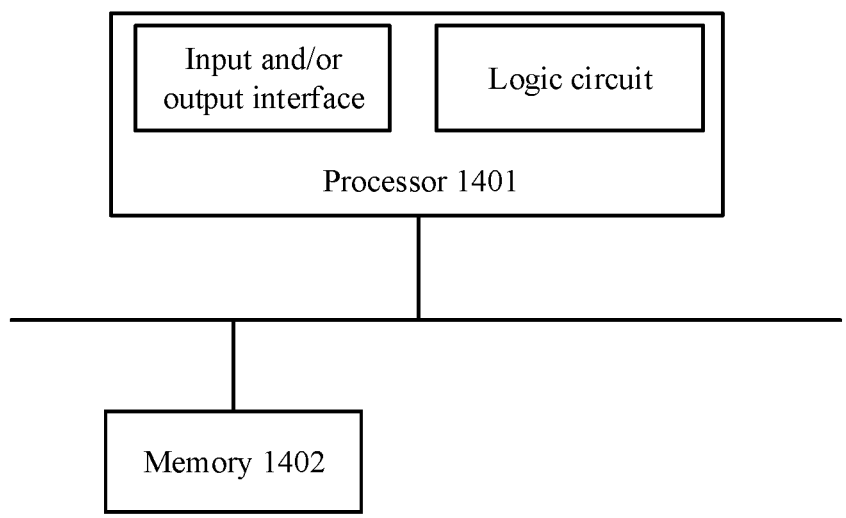

An embodiment of this application further provides a schematic structural diagram of hardware of a communications apparatus (denoted as a communications apparatus 140). Referring to FIG. 14 or FIG. 15, the communications apparatus 140 includes a processor 1401. Optionally, the communications apparatus 140 further includes a memory 1402 connected to the processor 1401.

The processor 1401 may be a general-purpose central processing unit (central processing unit, CPU), a microprocessor, an application-specific integrated circuit (application-specific integrated circuit, ASIC), or one or more integrated circuits configured to control program execution of the solutions in this application. The processor 1401 may alternatively include a plurality of CPUs, and the processor 1401 may be a single-core processor (single-CPU) or a multi-core processor (multi-CPU). The processor herein may refer to one or more devices, circuits, or processing cores configured to process data (for example, computer program instructions).

The memory 1402 may be a ROM or another type of static storage device that can store static information and instructions, or a RAM or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory 1402 is not limited in this embodiment of this application. The memory 1402 may exist independently, or may be integrated into the processor 1401. The memory 1402 may include computer program code. The processor 1401 is configured to execute the computer program code stored in the memory 1402, to implement the method provided in the embodiments of this application.

In a first possible implementation, referring to FIG. 14, the communications apparatus 140 further includes a transceiver 1403. The processor 1401, the memory 1402, and the transceiver 1403 are connected through a bus. The transceiver 1403 is configured to communicate with another device or a communications network. Optionally, the transceiver 1403 may include a transmitter and a receiver. A component configured to implement a receiving function in the transceiver 1403 may be considered as a receiver. The receiver is configured to perform a receiving step in the embodiments of this application. A component configured to implement a sending function in the transceiver 1403 may be considered as a transmitter. The transmitter is configured to perform a sending step in the embodiments of this application.

Based on the first possible implementation, the schematic structural diagram shown in FIG. 14 may be used to show a structure of the network device or the terminal in the foregoing embodiments.

When the schematic structural diagram shown in FIG. 14 is used to show the structure of the terminal in the foregoing embodiments, the processor 1401 is configured to control and manage an action of the terminal. For example, the processor 1401 is configured to support the terminal in performing the method shown in FIG. 9, the method shown in FIG. 10, the method shown in FIG. 11 (in this case, the terminal is the first communications apparatus), and/or an action performed by the terminal in another process described in the embodiments of this application. The processor 1401 may communicate with another network entity through the transceiver 1403, for example, communicate with the second communications apparatus (the second communications device is the network device) shown in FIG. 11. The memory 1402 is configured to store program code and data that are of the terminal.

When the schematic structural diagram shown in FIG. 14 is used to show the structure of the network device in the foregoing embodiments, the processor 1401 is configured to control and manage an action of the network device. For example, the processor 1401 is configured to support the network device in performing the method shown in FIG. 11 (in this case, the network device is the second communications apparatus), and/or an action performed by the network device in another process described in the embodiments of this application. The processor 1401 may communicate with another network entity through the transceiver 1403, for example, communicate with the first communications apparatus (the first communications apparatus may be the terminal) shown in FIG. 11. The memory 1402 is configured to store program code and data that are of the network device.

In a second possible implementation, the processor 1401 includes a logic circuit and at least one of an input interface and an output interface. The output interface is configured to perform a sending action in a corresponding method, and the input interface is configured to perform a receiving action in a corresponding method.

Based on the second possible implementation, the schematic structural diagram shown in FIG. 15 may be used to show a structure of the network device or the terminal in the foregoing embodiments.

When the schematic structural diagram shown in FIG. 15 is used to show the structure of the terminal in the foregoing embodiments, the processor 1401 is configured to control and manage an action of the terminal. For example, the processor 1401 is configured to support the terminal in performing the method shown in FIG. 9, the method shown in FIG. 10, the method shown in FIG. 11 (in this case, the terminal is the first communications apparatus), and/or an action performed by the terminal in another process described in the embodiments of this application. The processor 1401 may communicate with another network entity through the at least one of the input interface and the output interface, for example, communicate with the second communications apparatus shown in FIG. 11 (the second communications device is the network device). The memory 1402 is configured to store program code and data that are of the terminal.

When the schematic structural diagram shown in FIG. 15 is used to show the structure of the network device in the foregoing embodiments, the processor 1401 is configured to control and manage an action of the network device. For example, the processor 1401 is configured to support the network device in performing the method shown in FIG. 11 (in this case, the network device is the second communications apparatus), and/or an action performed by the network device in another process described in the embodiments of this application. The processor 1401 may communicate with another network entity through the at least one of the input interface and the output interface, for example, communicate with the first communications apparatus shown in FIG. 11 (the first communications device may be the terminal). The memory 1402 is configured to store program code and data that are of the network device.

In addition, an embodiment of this application further provides a schematic structural diagram of hardware of a terminal (denoted as a terminal 160). For details, refer to FIG. 16.

Figure 16:
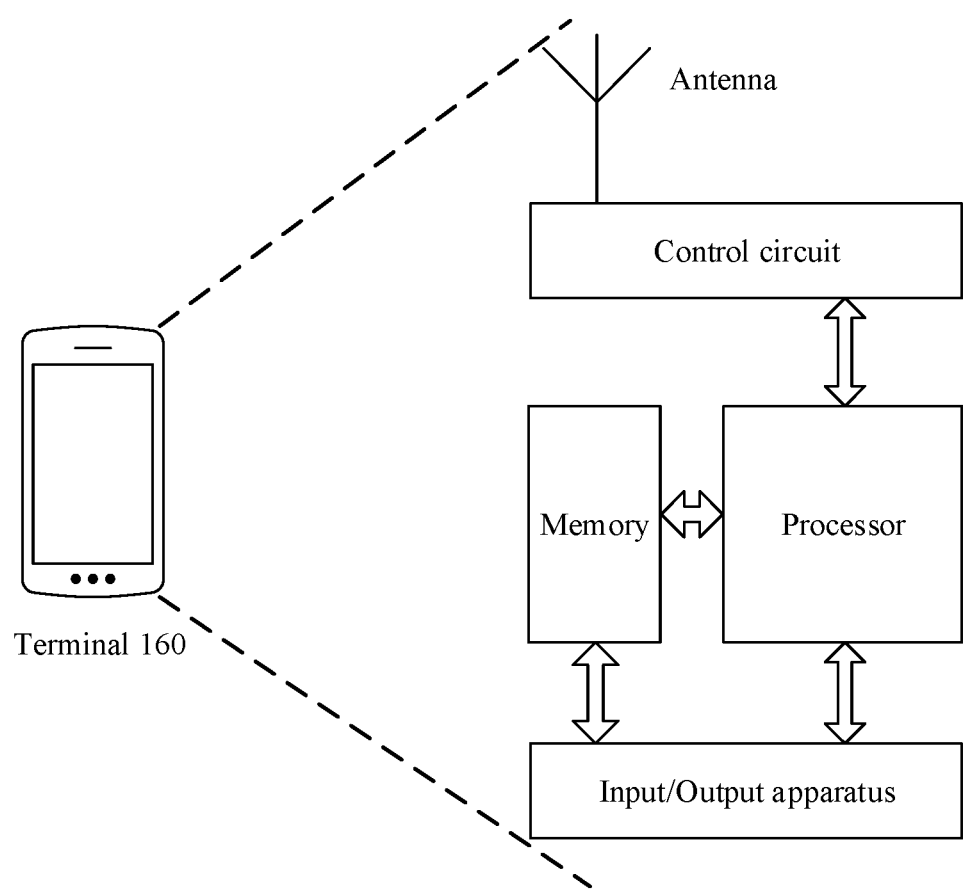
FIG. 16 is a schematic structural diagram of hardware of a terminal according to an embodiment of this application.

FIG. 16 is a schematic structural diagram of hardware of the terminal 160. For ease of description, FIG. 16 shows only main components of the terminal. As shown in FIG. 16, the terminal 160 includes a processor, a memory, a control circuit, an antenna, and an input/output apparatus.

The processor is mainly configured to: process a communications protocol and communication data, control the entire terminal, execute a software program, and process data of the software program. For example, the processor is configured to control the terminal to perform the method shown in FIG. 9, the method shown in FIG. 10, the method shown in FIG. 11 (in this case, the terminal is the first communications apparatus), and/or an action performed by the terminal in another process described in the embodiments of this application. The memory is mainly configured to store the software program and the data. The control circuit (which may also be referred to as a radio frequency circuit) is mainly configured to: perform conversion between a baseband signal and a radio frequency signal, and process the radio frequency signal. A combination of the control circuit and the antenna may also be referred to as a transceiver that is mainly configured to receive/send a radio frequency signal in a form of an electromagnetic wave. The input/output apparatus such as a touchscreen, a display, or a keyboard is mainly configured to: receive data entered by a user and output data to the user.

After the terminal is powered on, the processor can read the software program in the memory, interpret and execute instructions of the software program, and process the data of the software program. When the processor needs to send data through the antenna, after performing baseband processing on the to-be-sent data, the processor outputs a baseband signal to the control circuit in the control circuit; and the control circuit performs radio frequency processing on the baseband signal and then sends the radio frequency signal to the outside in a form of an electromagnetic wave through the antenna. When data is sent to the terminal, the control circuit receives a radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 16 shows only one memory and one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communications protocol and communication data, and the central processing unit is mainly configured to: control the entire terminal, execute software program, and process data of the software program. Functions of the baseband processor and the central processing unit are integrated into the processor in FIG. 16. A person skilled in the art may understand that the baseband processor and the central processing unit each may be an independent processor, and are interconnected by using a technology such as a bus technology. A person skilled in the art may understand that the terminal may include a plurality of baseband processors to adapt to different network standards, and the terminal may include a plurality of central processing units to enhance a processing capability of the terminal. The components in the terminal may be connected through various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the memory in a form of a software program. The processor executes the software program to implement a baseband processing function.

In an implementation process, the steps of the methods provided in the embodiments may be completed by using a hardware integrated logical circuit in the processor, or by using an instruction in a form of software. The steps in the methods disclosed with reference to the embodiments of this application may be directly performed and completed by a hardware processor, or may be performed and completed by a combination of hardware in the processor and a software module. For other descriptions about the processor in FIG. 16, refer to the descriptions related to the processor in FIG. 14 and FIG. 15. Details are not described again.

An embodiment of this application further provides a computer readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communications system, including the foregoing network device and the foregoing terminal.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to this application without departing from the scope of this application. Correspondingly, the specification and accompanying drawings are merely examples for description of this application defined by the appended claims, and are considered as any or all of modifications, variations, combinations, or equivalents that cover the scope of this application. It is clear that a person skilled in the art can make various modifications and variations to this application without departing from the spirit and scope of this application. In this way, if these modifications and variations to this application fall within the scope of the claims of this application and their equivalent technologies, this application is also intended to cover these modifications and variations.

What is claimed is:

1. A pending scheduling request SR cancellation method, applied in a communications apparatus, comprising:
   triggering SRs; and
   when an uplink grant meets a first condition or an uplink medium access control (MAC) protocol data unit (PDU) meets a second condition, canceling all pending first-type SRs in the SRs, wherein the first-type SR is an SR triggered by an uplink buffer status report (BSR); and
   when a sidelink grant meets a third condition, or the uplink MAC PDU meets a fourth condition, canceling all pending second-type SRs in the SRs, wherein the second-type SR is an SR triggered by a first sidelink BSR;

wherein that the uplink MAC PDU meets the second condition comprises: the uplink MAC PDU comprises a non-truncated uplink BSR MAC control element (CE), wherein the non-truncated uplink BSR MAC CE comprises a buffer status of the communications apparatus up to and comprising a last event that triggers the uplink BSR before the uplink MAC PDU is assembled; and the canceling all pending first-type SRs comprises: when the uplink MAC PDU is transmitted, canceling all pending first-type SRs that are triggered before the uplink MAC PDU is assembled.

2. The method according to claim 1, wherein the communications apparatus is a terminal.

3. The method according to claim 1, wherein that the uplink grant meets the first condition comprises: the uplink grant is sufficient to accommodate all available pending uplink data.

4. The method according to claim 3, wherein the second-type SR comprises a first sub-type SR, the first sub-type SR is an SR triggered by a second sidelink BSR, a second sidelink logical channel that triggers the second sidelink BSR meets a seventh condition, the second sidelink BSR belongs to the first sidelink BSR, and the seventh condition is: at least one of an SR configuration to which the second sidelink logical channel is mapped and an SR resource to which the second sidelink logical channel is mapped is also mapped to at least one uplink logical channel; or a configuration corresponding to the second sidelink logical channel or an SR configuration to which the second sidelink logical channel is mapped comprises first indication information, wherein the first indication information indicates to cancel, when the uplink grant meets the first condition, the SR triggered by the second sidelink BSR.

5. The method according to claim 1, wherein the second-type SR comprises a second sub-type SR, the second sub-type SR is an SR triggered by a third sidelink BSR, a third sidelink logical channel that triggers the third sidelink BSR meets an eighth condition, the third sidelink BSR belongs to the first sidelink BSR, and the eighth condition is: at least one of an SR configuration to which the third sidelink logical channel is mapped and an SR resource to which the third sidelink logical channel is mapped is also mapped to at least one uplink logical channel; or a configuration corresponding to the third sidelink logical channel or an SR configuration to which the third sidelink logical channel is mapped comprises second indication information, wherein the second indication information indicates to cancel, when the uplink MAC PDU meets the second condition, the SR triggered by the third sidelink BSR.

6. The method according to claim 1, wherein that the sidelink grant meets the third condition comprises: the sidelink grant is sufficient to accommodate all available pending sidelink data.

7. The method according to claim 6, wherein the second-type SR comprises a third sub-type SR, the third sub-type SR of the second type is an SR triggered by a fourth sidelink BSR, a fourth sidelink logical channel that triggers the fourth sidelink BSR meets a ninth condition, the fourth sidelink BSR belongs to the fourth sidelink BSR, and the ninth condition is: the fourth sidelink logical channel and any uplink logical channel are mapped to different SR configurations and/or different SR resources; or a configuration corresponding to the fourth sidelink logical channel or an SR configuration to which the fourth sidelink logical channel is mapped comprises third indication information, wherein the third indication information indicates to cancel, when the sidelink grant meets the third condition, the SR triggered by the fourth sidelink BSR.

8. The method according to claim 1, wherein that the uplink MAC PDU meets the fourth condition comprises: the uplink MAC PDU comprises a non-truncated sidelink BSR MAC CE, wherein the non-truncated sidelink BSR MAC CE comprises a buffer status of the communications apparatus up to and comprising a last event that triggers a sidelink BSR before the uplink MAC PDU is assembled; and the canceling all pending second-type SRs comprises: when the uplink MAC PDU is transmitted, canceling all pending second-type SRs that are triggered before the uplink MAC PDU is assembled.

9. The method according to claim 8, wherein the second-type SR comprises a fourth sub-type SR, the fourth sub-type SR of the second type is an SR triggered by a fifth sidelink BSR, a fifth sidelink logical channel that triggers the fifth sidelink BSR meets a tenth condition, the fifth sidelink BSR belongs to the first sidelink BSR, and the tenth condition is: the fifth sidelink logical channel and any uplink logical channel are mapped to different SR configurations and/or different SR resources; or a configuration corresponding to the fifth sidelink logical channel or an SR configuration to which the fifth sidelink logical channel is mapped comprises fourth indication information, wherein the fourth indication information indicates to cancel, when the uplink MAC PDU meets the fourth condition, the SR triggered by the fifth sidelink BSR.

10. A terminal device, comprising a memory, a processor, and a computer program that is stored in the memory and that can be run on the processor, wherein when executing the program, the processor is configured to implement the following method:

triggering scheduling requests (SRs); and when an uplink grant meets a first condition or an uplink medium access control (MAC) protocol data unit (PDU) meets a second condition, canceling all pending first-type SRs in the SRs, wherein the first-type SR is an SR triggered by an uplink buffer status report (BSR); and when a sidelink grant meets a third condition, or the uplink MAC PDU meets a fourth condition, canceling all pending second-type SRs in the SRs, wherein the second-type SR is an SR triggered by a first sidelink BSR;

wherein that the uplink MAC PDU meets the second condition comprises: the uplink MAC PDU comprises a non-truncated uplink BSR MAC control element (CE), wherein the non-truncated uplink BSR MAC CE comprises a buffer status of the communications apparatus up to and comprising a last event that triggers the uplink BSR before the uplink MAC PDU is assembled; and the canceling all pending first-type SRs comprises: when the uplink MAC PDU is transmitted, canceling all pending first-type SRs that are triggered before the uplink MAC PDU is assembled.

11. The terminal device according to claim 10, wherein that the uplink grant meets the first condition comprises: the uplink grant is sufficient to accommodate all available pending uplink data.

12. The terminal device according to claim 10, wherein that the sidelink grant meets the third condition comprises: the sidelink grant is sufficient to accommodate all available pending sidelink data.

13. The terminal device according to claim 10, wherein that the uplink MAC PDU meets the fourth condition comprises: the uplink MAC PDU comprises a non-truncated sidelink BSR MAC CE, wherein the non-truncated sidelink BSR MAC CE comprises a buffer status of the terminal device up to and comprising a last event that triggers a sidelink BSR before the uplink MAC PDU is assembled; and the canceling all pending second-type SRs comprises: when the uplink MAC PDU is transmitted, canceling all pending second-type SRs that are triggered before the uplink MAC PDU is assembled.

14. A non-transitory computer readable storage medium, comprising instructions, wherein when the instructions are run on a terminal device, the terminal device is configured to implement the following method:

triggering scheduling requests (SRs); and when an uplink grant meets a first condition or an uplink medium access control (MAC) protocol data unit (PDU) meets a second condition, canceling all pending first-type SRs in the SRs, wherein the first-type SR is an SR triggered by an uplink buffer status report (BSR); and when a sidelink grant meets a third condition, or the uplink MAC PDU meets a fourth condition, canceling all pending second-type SRs in the SRs, wherein the second-type SR is an SR triggered by a first sidelink BSR;

wherein that the uplink MAC PDU meets the second condition comprises: the uplink MAC PDU comprises a non-truncated uplink BSR MAC control element (CE), wherein the non-truncated uplink BSR MAC CE comprises a buffer status of the communications apparatus up to and comprising a last event that triggers the uplink BSR before the uplink MAC PDU is assembled; and the canceling all pending first-type SRs comprises: when the uplink MAC PDU is transmitted, canceling all pending first-type SRs that are triggered before the uplink MAC PDU is assembled.

15. The non-transitory computer readable storage medium according to claim 14, wherein that the uplink grant meets the first condition comprises: the uplink grant is sufficient to accommodate all available pending uplink data.

16. The non-transitory computer readable storage medium according to claim 14, wherein that the sidelink grant meets the third condition comprises: the sidelink grant is sufficient to accommodate all available pending sidelink data.

17. The non-transitory computer readable storage medium according to claim 14, wherein that the uplink MAC PDU meets the fourth condition comprises: the uplink MAC PDU comprises a non-truncated sidelink BSR MAC CE, wherein the non-truncated sidelink BSR MAC CE comprises a buffer status of the terminal device up to and comprising a last event that triggers a sidelink BSR before the uplink MAC PDU is assembled; and the canceling all pending second-type SRs comprises: when the uplink MAC PDU is transmitted, canceling all pending second-type SRs that are triggered before the uplink MAC PDU is assembled.

\* \* \* \* \*